US012617660B2

(12) United States Patent
Cottingham et al.

(10) Patent No.: US 12,617,660 B2
(45) Date of Patent: May 5, 2026

(54) SIDE-SHIFT FORK CARRIAGE FOR A MATERIAL HANDLING MACHINE

(71) Applicant: J.C. Bamford Excavators Limited, Uttoxeter (GB)

(72) Inventors: Darryl Cottingham, Uttoxeter (GB); Matthew Coope, Uttoxeter (GB); Ross Taylor, Uttoxeter (GB); Edwin Ratcliffe, Uttoxeter (GB); Ben Rudd, Uttoxeter (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 235 days.

(21) Appl. No.: 18/117,392

(22) Filed: Mar. 3, 2023

(65) Prior Publication Data

US 2023/0278839 A1 Sep. 7, 2023

(30) Foreign Application Priority Data

Mar. 4, 2022 (GB) ..................................... 2203009
Nov. 1, 2022 (GB) ..................................... 2216220
Nov. 1, 2022 (GB) ..................................... 2216224

(51) Int. Cl.
*B66F 9/14* (2006.01)

(52) U.S. Cl.
CPC .................................... *B66F 9/146* (2013.01)

(58) Field of Classification Search
CPC .. B66F 9/14; B66F 9/142; B66F 9/143; B66F 9/144; B66F 9/146
See application file for complete search history.

(56) References Cited

U.S. PATENT DOCUMENTS 4,335,992 A * 6/1982 Reeves .................. B66F 9/146 414/667
4,986,721 A 1/1991 Lowder et al.
5,072,588 A 12/1991 Lowder et al.
5,088,880 A * 2/1992 Field, Jr. ................ B66F 9/143 414/667
5,139,385 A * 8/1992 Chase ..................... B66F 9/144 414/667
5,190,436 A * 3/1993 Sorlie ..................... B66F 9/144 414/667

(Continued)

FOREIGN PATENT DOCUMENTS

CN 113307188 A 8/2021
DE 2726147 A1 12/1978

(Continued)

OTHER PUBLICATIONS

Machine translation of DE 2726147 from Espacenet. (Year: 1978).*

(Continued)

*Primary Examiner* — Mark C Hageman
(74) *Attorney, Agent, or Firm* — MARSHALL, GERSTEIN & BORUN LLP

(57) ABSTRACT

A side-shift fork carriage for a material handling machine includes a frame; a first shuttle comprising a first fork attachment member for receiving a first fork; a first fork actuator operable to side-shift the first shuttle relative to the frame; a second shuttle comprising a second fork attachment member for receiving a second fork; and, a second fork actuator operable to side-shift the second shuttle relative to the frame, wherein the first and second fork actuators are operable in a first mode in which the position of the first and second shuttles are side-shifted to alter the lateral distance therebetween, and a second mode in which the first and second shuttles are shifted unidirectionally with the lateral distance therebetween remaining constant.

13 Claims, 15 Drawing Sheets

(56) References Cited

U.S. PATENT DOCUMENTS

| | | | | |
|---|---|---|---|---|
| 6,782,910 | B2 * | 8/2004 | Mondani | F15B 11/20 137/625.69 |
| 10,494,241 | B2 * | 12/2019 | Petronek | B66F 9/22 |
| 11,001,485 | B2 * | 5/2021 | Addicott | B66F 9/125 |
| 11,401,144 | B2 * | 8/2022 | Na | B66F 9/22 |
| 2013/0189064 | A1 | 7/2013 | Matti | |
| 2021/0206608 | A1 | 7/2021 | Prentice et al. | |
| 2023/0242388 | A1 * | 8/2023 | Walthers | F15B 11/22 60/484 |

FOREIGN PATENT DOCUMENTS

| | | | | |
|---|---|---|---|---|
| DE | 102007045311 | A1 * | 4/2009 | B66F 9/14 |
| EP | 1291313 | A2 | 3/2003 | |
| EP | 3412622 | A1 | 12/2018 | |
| JP | H024897 | U | 1/1990 | |
| JP | H03211196 | A | 9/1991 | |
| WO | WO-92/21606 | A1 | 12/1992 | |
| WO | WO-95/02552 | A1 | 1/1995 | |
| WO | WO-01/36313 | A1 | 5/2001 | |
| WO | WO-2008/091066 | A1 | 7/2008 | |

OTHER PUBLICATIONS

Machine translation of DE102007045311A1 from Espacenet (Year: 1999).*

Search Report issued in GB 2203009.2, dated Aug. 30, 2022.

Search Report issued in GB 2216220.0, dated Feb. 24, 2023.

Search Report issued in GB 2216224.2, dated Feb. 27, 2023.

* cited by examiner

SIDE-SHIFT FORK CARRIAGE FOR A MATERIAL HANDLING MACHINE

FIELD

The present invention relates to a carriage assembly for a working machine, a working machine. The present invention to a side-shift fork carriage for a material handling machine, e.g. a telehandler.

BACKGROUND

Material handling machines are commonplace in many commercial and industrial settings and used to transport loads of various types between locations. Material handling machines may be used with a number of different load handling attachments including forks.

Side-shifting fork carriages are well known in the art and allow the position of the forks to be laterally shifted relative to the material handling machine. This can be useful for positioning loads and for engaging with loads of various sizes and configurations.

FIG. 7 shows a material handling machine 701 in the form of a telehandler. Telehandlers are generally well known and comprise a vehicle with a pivoting telescopically extending working arm which allows items to be transported between different locations at varying heights with relative ease and flexibility. The material handling machine 701 comprises a body 701*a*, an operator cab 713, and a lifting arm 714 pivotably mounted at a first end to the body 712. The body 701*a* is located on a ground engaging structure 717 in the form of front and rear wheels. The machine 701 is generally elongate having a principal longitudinal axis.

The operator cab 713 is aligned with the longitudinal axis 711 and defines the principal forward facing direction of travel of the working machine. The operator cab 713 comprises the necessary controls for maneuvering the material handling machine 701 and also for manipulating the lifting arm 714 and carriage 710. The hydraulic feed provided to the carriage 710 is typically referred to as an auxiliary feed as its use will vary according to the attachment provided on the lifting arm 714.

Material handling machines 701 may be provided with one or more auxiliary feeds at the distal end of the lifting arm 714, each with a respective control device provided within the cab 713 for dedicated operation. The control device may comprise any suitable means such as a joystick, button, roller or lever, etc.

The lifting arm 14 is configured to carry a load handling implement such as a side-shift fork carriage 810 as shown in FIG. 8.

The fork carriage 810 of FIG. 8 is a side-shifting fork carriage having coupling attachments 814*a*, 814*b* for attaching to the lifting arm 714 of the material handling machine 701 and an external frame 812 which provide structural rigidity. The forks 820 are provided on side-shifting carriages 821 which are laterally movable using hydraulic cylinders 822. The forks 820 are typically moved in unison either towards each other or apart from one another with a single auxiliary hydraulic feed. A guide member 824 is located below the hydraulic actuators 822.

The present disclosure seeks to provide an improved side-shifting fork carriage.

SUMMARY

The present invention provides a side-shift fork carriage according to the appended claims and a method for operating the same.

In a first aspect the present disclosure may provide a side-shift fork carriage for a material handling machine comprising: a frame comprising a coupling portion for attaching the sliding fork carrier to the material handling machine; a first shuttle comprising a first fork attachment member for receiving a first fork; a first fork actuator operable to side-shift the first shuttle relative to the frame; a second shuttle comprising a second fork attachment member for receiving a second fork; and, a second fork actuator operable to side-shift the second shuttle relative to the frame; wherein the first and second fork actuators are operable to side-shift the first and second shuttles to alter the distance therebetween; and, wherein the first and second actuators are located above the first and second fork attachment members.

In a second aspect, the present disclosure may provide a side-shift fork carriage for a material handling machine comprising: a frame comprising a coupling portion for attaching the sliding fork carrier to the material handling machine; a first shuttle comprising a first fork attachment member for receiving a first fork; a first fork actuator operable to side-shift the first shuttle relative to the frame; a second shuttle comprising a second fork attachment member for receiving a second fork; and, a second fork actuator operable to side-shift the second shuttle relative to the frame; wherein the first and second fork actuators are operable in a first mode in which the position of the first and second shuttles are side-shifted to alter the lateral distance therebetween, and a second mode in which the first and second shuttles are shifted in a common direction at a common speed such that the lateral distance therebetween remains constant.

In a third aspect, the present disclosure may provide a side-shift fork carriage for a material handling machine comprising: a frame comprising a coupling portion for attaching the sliding fork carrier to the material handling machine; a first shuttle comprising a first fork attachment member for receiving a first fork; a first fork actuator operable to side-shift the first shuttle relative to the frame; a second shuttle comprising a second fork attachment member for receiving a second fork; and, a second fork actuator operable to side-shift the second shuttle relative to the frame; wherein the first and second actuators are located behind a protective panel.

In a fourth aspect, the present disclosure may provide a side-shift fork carriage for a material handling machine comprising: a frame comprising a coupling portion for attaching the sliding fork carrier to the material handling machine; a first shuttle comprising a first fork attachment member for receiving a first fork; a first fork actuator operable to side-shift the first shuttle relative to the frame; a second shuttle comprising a second fork attachment member for receiving a second fork; a second fork actuator operable to side-shift the second shuttle relative to the frame; and a valve block for providing an actuating hydraulic flow to the first and second fork actuators, wherein the valve block is comprises a changeover valve in which a first hydraulic feed line may be used to operate the fork actuators in a first mode in a first switch position, and a second mode in a second switch position, and wherein the valve block is configured to receive a second hydraulic feed line, wherein when connected, the second hydraulic feed line being used to control the fork actuators in the first or second mode, the first hydraulic feed line being used to operate the other of the first or second mode.

In a fifth aspect, the present disclosure provides: a side-shift fork carriage for a material handling machine comprising: a frame comprising a coupling portion for attaching the sliding fork carrier to the material handling machine; a first shuttle comprising a first fork attachment member for receiving a first fork; a first fork actuator operable to side-shift the first shuttle relative to the frame; a second shuttle comprising a second fork attachment member for receiving a second fork; a second fork actuator operable to side-shift the second shuttle relative to the frame; wherein the first and second attachment members comprise a common elongate attachment member; and, wherein the common attachment member and a lower cross-member of the frame define therebetween a window for an operator to view the fork ends when engaging with a load, and wherein the window comprises only the fork shuttles or the fork shuttles and a guide member configured to guide the movement of the shuttles under the influence of the fork actuators.

In a sixth aspect, the present disclosure provides a material handling machine comprising any carriage of the present disclosure.

In a seventh aspect, the present disclosure provides a method of operating a material handling machine comprising: connecting a first auxiliary feed to a valve block of the carriage and selecting: a first switch position of a changeover valve to operate the carriage in a first mode in which the forks are configured to be moved in opposing directions; and, a second switch position of the changeover valve to operate the carriage in a second mode in which the forks are configured to be side-shifted unidirectionally in unison. Optionally, the method may further comprise: connecting a second hydraulic feed and using the first and second hydraulic feeds to operate the carriage in the first and second modes without switching the changeover valve.

Generally, the present disclosure provides a side-shift fork carriage for a material handling machine. The carriage may comprise: a frame comprising a coupling portion for attaching the sliding fork carrier to the material handling machine; a first shuttle comprising a first fork attachment member for receiving a first fork; a first fork actuator operable to side-shift the first shuttle relative to the frame; a second shuttle comprising a second fork attachment member for receiving a second fork; and, a second fork actuator operable to side-shift the second shuttle relative to the frame.

The first and second fork actuators may be located above the first and second fork attachment members.

The first and second fork actuators may be operable in a first mode in which the position of the first and second shuttles are side-shifted to alter the lateral distance therebetween. The first and second fork actuators may be operable in a second mode in which the first and second shuttles are shifted in a common direction at a common speed such that the lateral distance therebetween remains constant.

When operated in the first mode, the first and second fork actuators may be operable to simultaneously move the first and second shuttles in opposing directions. The opposing directions may be laterally towards each other or away from each other and a centreline of the carriage.

The first and second actuators may be hydraulic cylinders comprising a rod end port and a cap end port. Either the rod end ports of the first and second actuators or the cap end ports of the first and second actuators may be connected in hydraulic flow series in the second mode. When the rod end ports are connected in hydraulic flow series, an actuating hydraulic feed provided to the cap end port of one of the first or second fork actuators results in a return flow from the cap end port of the other first or second fork actuators in the second mode, or vice versa.

When in the first mode, either both the rod end ports or both the cap end ports may be configured to receive a simultaneous actuating hydraulic flow to result in corresponding extension or retraction of both first and second fork actuators.

The carriage may further comprise a flow divider. An actuating hydraulic flow may be provided to the rod end ports or cap end ports via the flow divider.

The carriage may further comprise a valve block configured to selectively provide an actuating hydraulic flow to the first and second fork actuators. The valve block may be configurable to provide the first mode and second mode.

The valve block may comprise a changeover valve to switch between the first mode and the second mode. The changeover valve may be manually operated. The valve block may comprise first input ports and second input ports. Each of the first and second input ports may be configured to receive, respectively, a first actuating hydraulic feed and a second actuating hydraulic feed.

The actuating hydraulic flows may be provided from a first and/or a second auxiliary feed provided from the material handling machine.

The valve block may be configured to be operable in the first mode and second mode when connected to a first actuating hydraulic feed only. The first mode and second mode may be provided by switching the changeover valve between a first position which corresponds to the first mode and a second position which corresponds to a second mode.

When connected to the first and second actuating hydraulic feed, the valve block may be configured to provide the first mode and second mode using the first actuating hydraulic feed and the second actuating hydraulic feed without switching the changeover valve.

The changeover valve may be retained in the second mode position for the first mode and second operation when the first and second hydraulic feeds are connected.

The valve block may comprise first mode first and second hydraulic lines. Each of the (first mode) first and second hydraulic lines may comprise pilot operated check valves. An actuating flow in either of the first mode first or second hydraulic lines may be configured to provide pilot pressure in the other of the first mode first and second hydraulic line pilot operated check valves, thereby providing a return flow path for the actuating flow.

Either of the first mode first or second hydraulic lines may comprise the flow divider.

The valve block may comprise second mode first and second hydraulic lines in hydraulic flow communication with the cap end ports of the first and second fork actuators respectfully.

A pair of pressure relief valves may be connected in anti-parallel between the second mode first and second hydraulic lines. Each of the second mode first and second hydraulic lines may be comprise flow restrictors to restrict the flow rate in the second mode relative to the first mode.

The first and second fork actuators may be arranged horizontally and in an anti-parallel orientation. The cap end of each cylinder may be attached to an outboard side of the frame.

The first and second fork actuators may be located behind a protective panel. The protective panel may be provided on a front face of the carriage and define a load zone in which a load is located on the forks. The protective panel may be located vertically above the first and second fork attachment members. The protective panel may be separated from the attachment members to provide clearance for a fork to be inserted over the attachment member and lowered thereon.

The protective panel may be fixed to a structural cross-member which extends laterally in front of a guide member. The protective panel may be removably attached, e.g. for maintenance purposes.

The first and second fork attachment members may be provided by a common elongate attachment member. The common elongate member may extend fully between first and second side members of the frame. The common elongate member may be configured to support the weight of the forks and fork load. The forks may be configured to pivot about the attachment member.

The carriage may further comprise a guide member along which the first and second shuttles laterally shift under the influence of the fork actuators. The guide member may be provided above the fork actuators. The guide member may be located behind or above the protective panel.

The guide member may be a first guide member. The carrier may further comprise a second guide member located towards a lowermost portion of the first and second shuttles. The second guide member may be a structural cross-member of the frame. The second guide member may comprise an elongate box section.

The second guide member may be located at to the rear of a contacting surface of the first and second shuttles so as to restrict rearward movement of the first and second shuttles about the respective attachment members when loaded. The contacting surface may comprise the surface of one or more bearing elements.

The second guide member may comprise a running surface against which the first and second shuttles are urged under load and move against whilst side-shifting.

The first and second shuttles may comprise bearings configured to run on the running surface. The bearings may comprise wear pads or roller bearings having a vertical axis of rotation. Each of the first and second shuttles may comprise first and second bearings located on either side of a fork when attached to the respective shuttle.

The bearings may be provided at the lowermost terminal end of the first and second shuttles. The bearings may be located within a bearing enclosure. The bearing enclosure may be provided on outboard side of the bearing elements and, optionally, in front of the bearing elements so as to be separated from a load in a load zone of the forks.

The carriage may further comprise an intermediate guide member located at a mid-portion of the first and second shuttle. The intermediate guide member may be positioned proximate to the attachment member. The intermediate guide member may be positioned aft of the first and second fork attachment members. The intermediate guide member may be below the first and second fork attachment members.

The first and second shuttles may comprise one or more bushes which slidably engage with the first, second or intermediate guide members.

The frame may comprises a first side member and a second side member between which the first shuttle and second shuttle are vertically disposed. The frame may further comprise a lower cross-member located beneath the fork attachment bar.

The lower cross-member, common fork attachment members and frame side members may define a window therebetween. The window may comprise the first and second shuttle members only. The window may comprise the first and second shuttle members and a guide member only.

The frame may comprise a vertical central member extending between the lower cross-member and the fork attachment member.

The lower cross-member may comprise the second guide member. The lower cross-member may comprise an elongate box section member and the running surface is provided on the front facing surface.

The first and second shuttles comprise first and second parallel sidewalls separated by a gap to define a pocket in which the respective fork is received. Each of the fork attachment members and guide member may extend between the first and second side members.

The fork attachment member and guide member(s) may extend through the central member.

The coupling portion may comprise first and second side attachments arranged towards the first and second sides of the frame. The first and second side attachments may be configured to receive corresponding attachments on a material handling machine. The attachments on the material handling machine may comprise hydraulically actuated attachments, e.g. linearly operated attachment pins. The coupling portions may provide fastener points for receiving one or more fasteners, e.g. a bolt.

The first and second fork actuators may be hydraulic cylinders. The carriage may further comprise a valve block configured to selectively provide pressurised hydraulic fluid to the first and second fork actuators. The valve block may be operable in a first mode in which the separation between the first and second shuttles can be altered, and a second mode in which the first and second shuttles can be side-shifted unidirectionally, e.g. in a common direction, in unison, e.g. at a common speed and duration.

The valve block may comprise a changeover valve to switch between the first mode and the second mode. The changeover valve may be manually operated.

The valve block may comprise first input ports and second input ports, each of the first and second input ports configured to receive, respectively, a first actuating hydraulic feed and a second actuating hydraulic feed, e.g. from the material handling machine.

The valve block may be configured to be operable in the first mode and second mode when connected to a first actuating hydraulic feed only. The first mode and second mode may be provided by switching the changeover valve between a first position which corresponds to the first mode and a second position which corresponds to a second mode.

When connected to the first and second hydraulic feed, the valve block may be configured to be operable in the second mode by the first hydraulic feed and second mode by the first hydraulic feed without switching the changeover valve.

Each of the first and second hydraulic cylinders may comprise a rod end port and a cap end port, wherein the rod end ports are connected in hydraulic series such that an actuating hydraulic feed provided to the cap end port of one of the fork actuators results in a return flow from the cap end port of the other fork actuator in the second mode.

The valve block may further comprise first mode first and second hydraulic lines. Each of the first and second hydraulic lines may comprise pilot operated check valves. The pilot operated check valves may block allow flow in a first direction and block flow in a second direction. The provision of pilot pressure to the check valve may open the check valve in the second direction. The first and second hydraulic lines may be connected to the pilot line of the pilot operated check valve in the other of the first and second hydraulic line. Hence, an actuating flow in either of the first or second hydraulic lines may provide pilot pressure in the other of the first and second hydraulic line pilot operated check valves. As such an actuating flow in the first hydraulic line may return in the second hydraulic line having flowed through either or both fork actuators, or vice versa.

The valve block may further comprise a flow divider in either of the first or second hydraulic lines. The flow divider may divide the flow from the hydraulic line to provide two corresponding identical flows into the first and second fork actuators.

The carriage may further comprise second mode first and second hydraulic lines and a pair of pressure relief valves connected in anti-parallel between the second mode first and second hydraulic lines and/or flow restrictors in the second mode first and second hydraulic lines to restrict the flow rate in the second mode relative to the first mode.

The carriage may further comprise operator instructions, e.g. on a decal, the operator instructions indicating the position of the changeover valve for when only a first hydraulic feed is connected, and when a first and a second hydraulic feed is connected.

The present disclosure may provide a material handling machine comprising the carriage. The material handling machine may comprise a telehandler, roto-telehandler, fork-lift truck, excavator or other. Generally, the carriage of the present disclosure may be used with any material handling machine having the facility to carrier such a carriage. The material handling machine may have at least one auxiliary hydraulic feed. The material handling machine may comprise a working arm.

The present disclosure provides a method operating a material handling machine comprising the carriage of the present disclosure.

The method may comprise: connecting a first auxiliary feed to a valve block of the carriage and selecting: a first switch position of a changeover valve to operate the carriage in a first mode in which the forks are configured to be moved in opposing directions; and, a second switch position of the changeover valve to operate the carriage in a second mode in which the forks are configured to be side-shifted unidirectionally in unison.

The method may comprise manually operating the changeover valve. The method may comprise adjusting the relative positions of the forks prior to engaging a load with the forks. The method may comprise adjusting forks once the load is engaged. The method may comprise elevating the load with the material handling machine and side-shifting the forks in unison under load.

The method may further comprise connecting a second hydraulic feed and using the first and second hydraulic feeds to operate the carriage in the first and second modes without switching the changeover valve.

According to an eight aspect there is provided a carriage for mounting to a working arm of a working machine, the carriage comprising: two side members, and upper and lower cross members extending between the two side members; an implement mount comprising a fork mounting shaft extending between the two side members and configured for mounting first and second forks thereon to mount said forks to the carriage; and an adjuster assembly comprising an actuator mounted on the carriage, the actuator connected to a hydraulic flow path for delivering hydraulic pressure to the actuator, wherein the actuator is configured to move the forks on the fork mounting shaft.

Advantageously, this arrangement provides an adjuster assembly that is integrated with the carriage, and so enables an operator to adjust the position of the forks remotely (i.e. from within an operator cab of a working machine).

The adjuster assembly may comprise first and second adjuster bodies each comprising a first recess configured to receive at least a part of one of the forks therein, and wherein the actuator is configured to move the adjuster bodies in order to move the forks.

This arrangement further integrates the adjuster assembly with the carriage, and facilitates adjustment of the forks on the carriage.

The recess may taper in a direction towards a base of the recess.

This facilitates mounting of the forks in the adjuster bodies, and helps to correctly position the forks within the adjust bodies.

A distal region of each recess may be curved.

This facilitates mounting of the forks in the recesses of the adjuster bodies.

The first and second adjuster bodies may be mounted on an adjuster cross member mounted between the side members.

This integrates the adjuster bodies with the carriage.

Each adjuster body may comprise a second recess configured to receive the fork mounting shaft therein.

In this way, the fork mounting shaft acts as a stop to prevent rotation of the first and second adjuster bodies.

The adjuster assembly may comprise first and second actuators configured to move first and second adjuster bodies, respectively.

This has been found to improve the functionality of movement of the forks.

The carriage may comprise a valve along the hydraulic flow path to equally distribute hydraulic flow between the first and second actuators.

The adjuster assembly may be configured such that, in a first mode, the first and second forks are fixed relative to each when they are moved along the fork mounting shaft, and, in a second mode, the first and second forks are moveable relative to each other about a fixed centre point.

The carriage may comprise a hydraulic block mounted to the carriage and connected upstream of the hydraulic flow path.

The upper cross member may define a recess of channel, and wherein the actuator is positioned within the channel.

The fork mounting shaft may be releasably mounted to the side members.

The carriage may comprise a mounting arrangement for pivotally mounting the carriage to an arm of a working machine.

According to a ninth aspect there is provided a carriage assembly comprising: a tool mounting carriage comprising a mounting arrangement for pivotally mounting the tool mounting carriage to an arm of a working machine; and a carriage according to the first aspect mounted to the tool mounting carriage.

According to a tenth aspect there is provided a carriage assembly comprising: a first coupling body comprising an arm mounting arrangement for pivotally mounting the first coupling body to an arm of a working machine so as to be pivotable relative to the arm about a first axis; a second coupling body pivotally mounted to the first coupling body so as to be pivotable relative to first coupling body about a second axis that is substantially perpendicular to the first axis, a carriage according to the first aspect pivotally mounted to the second coupling body so as to be pivotable relative to the second coupling body about a third axis that is substantially perpendicular to the first axis and the second axis.

The first coupling body may be integrally formed, e.g. integrally cast, as a unitary component and/or wherein the second coupling body may be integrally formed, e.g. integrally cast, as a unitary component.

According to a eleventh aspect there is provided a working machine comprising: a body; a ground engaging propulsion arrangement supporting the body; a working arm pivotally connected to the body; and a carriage assembly according to the second or third aspect mounted to a distal end of the working arm.

The working machine may comprise a first auxiliary hydraulic connector configured for supplying hydraulic fluid to the actuator.

The first auxiliary connector may be provided on the working arm.

The adjuster assembly may be configured such that, in a first mode, the first and second forks are fixed relative to each when they are moved along the fork mounting shaft, and, in a second mode, the first and second forks are moveable relative to each other about a fixed center point.

The working machine may comprise an operator input and a control system configured to select the first mode or the second mode based on an input to the operator input.

The working machine may be a telescopic handler, a rotating telescopic handler, a forklift, a skid-steer loader, a compact track loader, a wheel loader, or a telescopic wheel loader.

The skilled person will appreciate that except where mutually exclusive, a feature described in relation to any one of the aspects, embodiments or examples described herein may be applied mutatis mutandis to any other aspect, embodiment or example. Furthermore, except where mutually exclusive, any feature described herein may be applied to any aspect and/or combined with any other feature described herein.

BRIEF DESCRIPTION OF DRAWINGS

Embodiments will now be described by way of example only with reference to the accompanying figures, in which.

DETAILED DESCRIPTION

Figure 1:
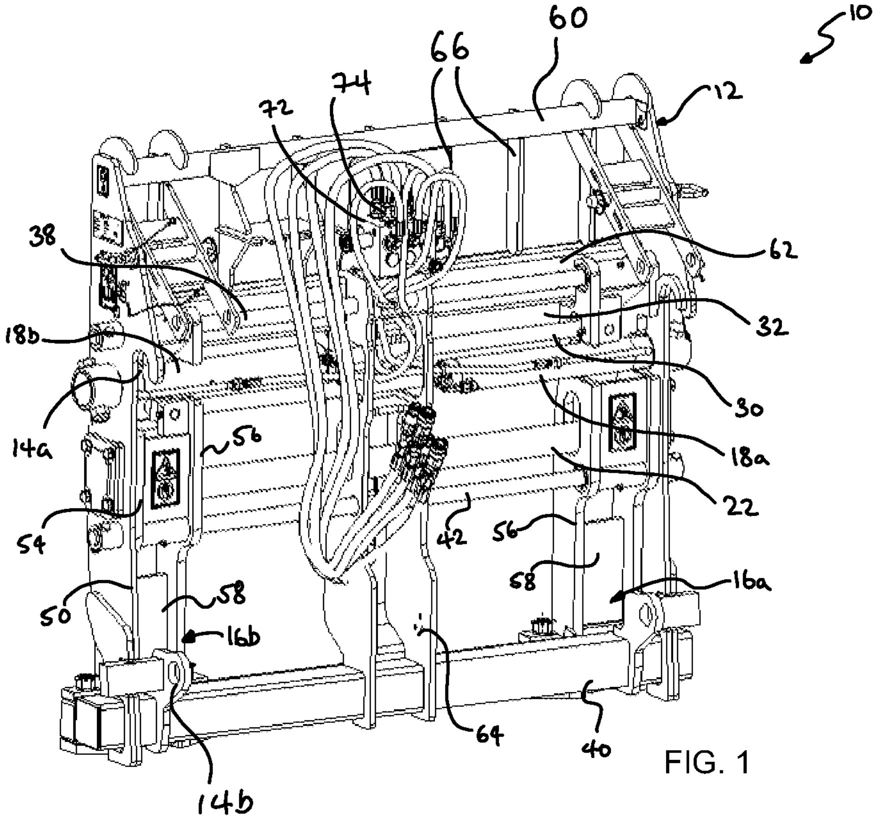
FIG. 1 shows a perspective rear view of a side-shift fork carriage according to the present disclosure.
Figure 2:
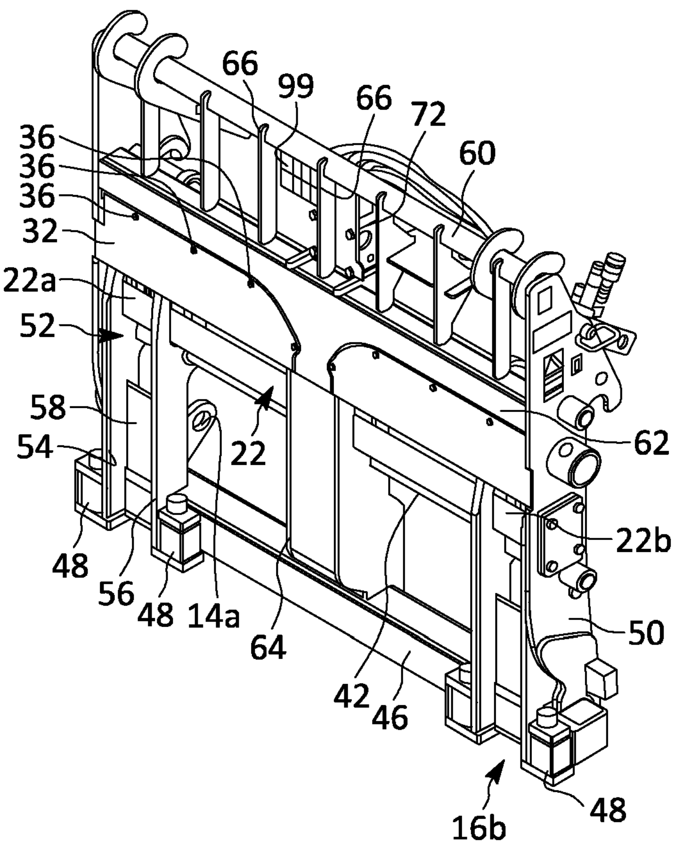
FIG. 2 shows a perspective front view of a side-shift fork carriage according to the present disclosure.
Figure 3A:
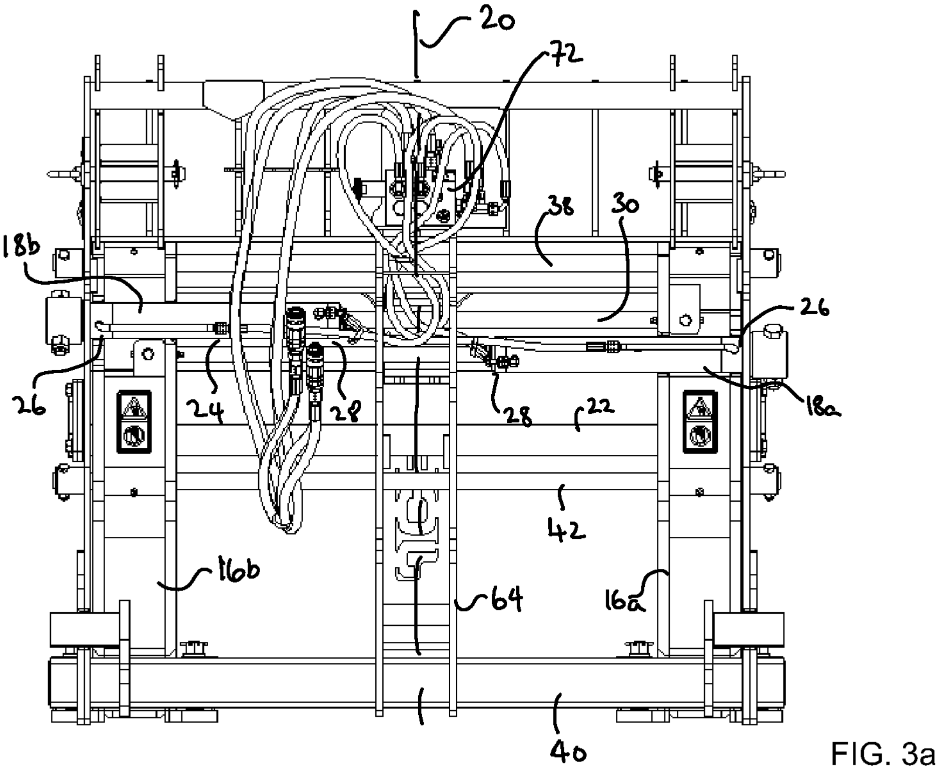
FIG. 3*a* shows a rear view of the carriage of FIGS. 1 and 2.
Figure 4:
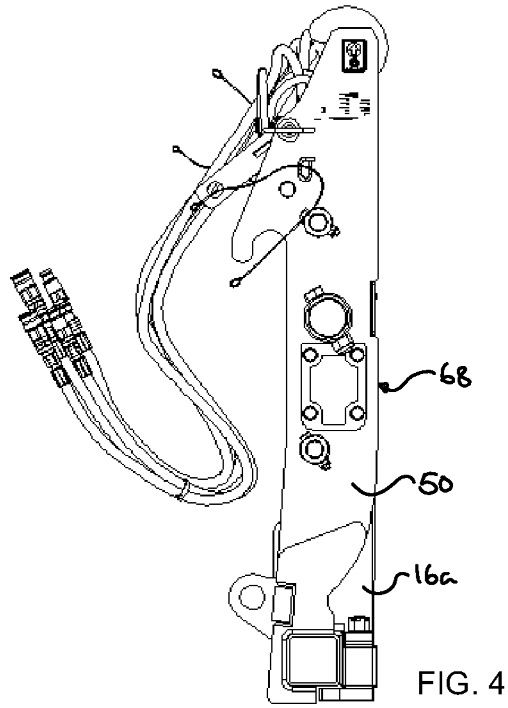
FIG. 4 shows a side view of the carriage of FIGS. 1 and 2.
Figure 3B:
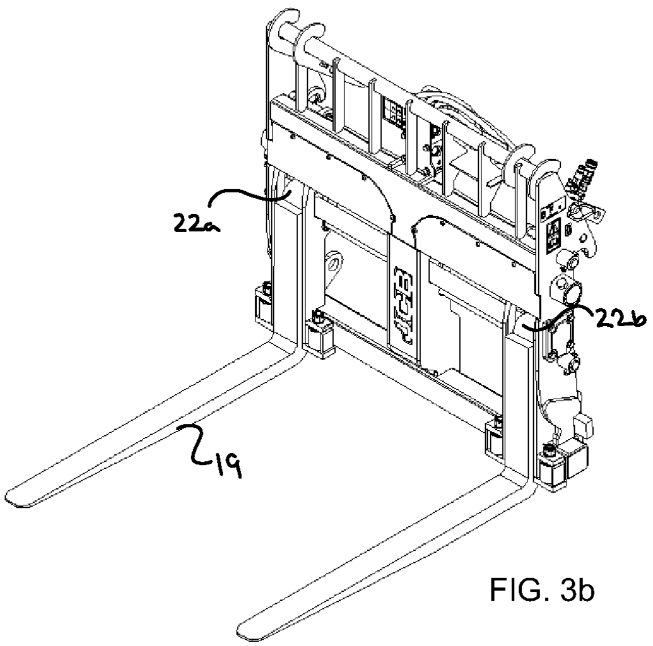
FIG. 3*b* shows the side-shift fork carriage with forks.

In the following detailed description, numerous specific details are set forth in order to provide a thorough understanding of various embodiments and the inventive concept. However, those skilled in the art will understand that: the present invention may be practiced without these specific details or with known equivalents of these specific details; that the present invention is not limited to the described embodiments; and, that the present invention may be practiced in a variety of alternative embodiments. It will also be appreciated that well known methods, procedures, components, and systems may have not been described in detail.

In the following description, the term front and rear may be used in reference to the front and rear of the material handling machine and/or in relation to the load zone which is defined above the forks at the front of the carriage.

With reference to FIGS. 1 to 4, there is disclosed a side-shift fork carriage 10 for a material handling machine 701, such as a telehandler. The carriage 10 comprises a structural frame 12 which includes coupling portion 14*a*, 14*b* for attaching the carrier 10 to the material handling machine 710.

A first shuttle 16*a* and a second shuttle 16*b* which respectively carry first and second forks 19 are configured laterally shift with respect to the frame 12 and coupling portion 14*a*, 14*b*. Movement of the first shuttle 16*a* and second shuttle 16*b* is achieved by respective first and second fork actuators 18*a*, 18*b* which may be operated to allow selective positioning of each shuttle in relation to the other. In one embodiment, the fork actuators 18*a*, 18*b* may be used to simultaneously move the first and second shuttle 16*a*, 16*b* towards each other or away from each other in unison, thereby reducing or increasing the distance between the forks about a central point, e.g. a vertical centreline 20 of the carrier 10. As such, the spacings of the forks may be adjusted to suit different loads.

Additionally, the first and second fork actuators 18*a*, 18*b* may be configured to shift the first and second shuttles 16*a*, 16*b* in the same direction whilst maintaining the relative position between them. Hence, the position of the shuttles 16*a*, 16*b* may laterally shifted with respect to the frame 12 and material handling machine 701 to allow for accurate placement at a target location.

The carriage 10 may be configured to allow the forks 19 to be shifted whilst loaded. Hence, once a load has been picked up by the forks 19 and, for example, elevated to a target location, e.g. a storage location, the first and second fork actuators 18*a*, 18*b* may be used to side-shift the shuttles 16*a*, 16*b* and forks to allow correct placement.

The first and second shuttles 16*a*, 16*b* are each provided with respective fork attachment members 22*a*, 22*b* which receive a lifting fork as well known in the art. In the embodiment shown, the first and second fork attachment members 22*a*, 22*b* comprise an elongate member, e.g. round bar, over which a fork can be hooked and vertically restrained for load carrying. In the embodiment shown, the fork attachment members 22*a*, 22*b* are configured to receive an upper attachment portion of a fork and are positioned at a mid-point of the carrier height.

In the present embodiment, the fork attachment members 22*a*, 22*b* are provided by a common elongate attachment member 22 which extends laterally across the full extent of the carrier 10 and provides a principle load bearing structural member for reacting the fork load. The attachment member 22 may be configured to directly receive the fork as shown, however, in some embodiments the shuttles 16*a*, 16*b* may comprise a sleeve for receiving the fork. In such embodiments, the sleeve may engage the attachment member 22 via a linear bearing, e.g. a bush.

The first and second fork actuators 18*a*, 18*b* comprise linear actuators arranged to provide independent lateral shift to each of the shuttles 16*a*, 16*b*. Any suitable linear actuator may be used but in the embodiments shown, the actuators 18*a*, 18*b* are conventional hydraulic actuators in the form of hydraulic cylinders. Each cylinder comprises a barrel 24 having a rod end 26 and a cap end 28. A piston is sealably and slidably located within the barrel 24 to define a full bore chamber on the cap end side 28 and an annulus chamber of the rod end side 26. A shaft 30 extends from the rod end side 26 of the piston through the annulus chamber and a sealed aperture in the rod end side cap. To extend and retract the shaft 30, pressurised hydraulic fluid is selectively introduced to the respective full bore chamber or annulus chamber via ports with the opposing chamber being allowed to drain as well known in the art.

The cap end 28 of the barrel 24 may be attached to a structural member of the frame 12 and the distal end of the shaft 30 may be attached to the respective shuttle via suitable conventional mounts, such as a flange mount or lug mount.

The fork actuators 18*a*, 18*b* are arranged to lie in a horizontal orientation anti-parallel to each other. Thus, the first fork actuator 18*a*, is attached to the right hand side of the frame 12 (when viewed from in front) and the first shuttle 16*a* on the left hand side of the carrier 10, and the second fork actuator 18*b* is attached to the left hand side of the frame 12 and the second shuttle 16*b*, provided on the right hand side of the frame 12.

Figure 8:
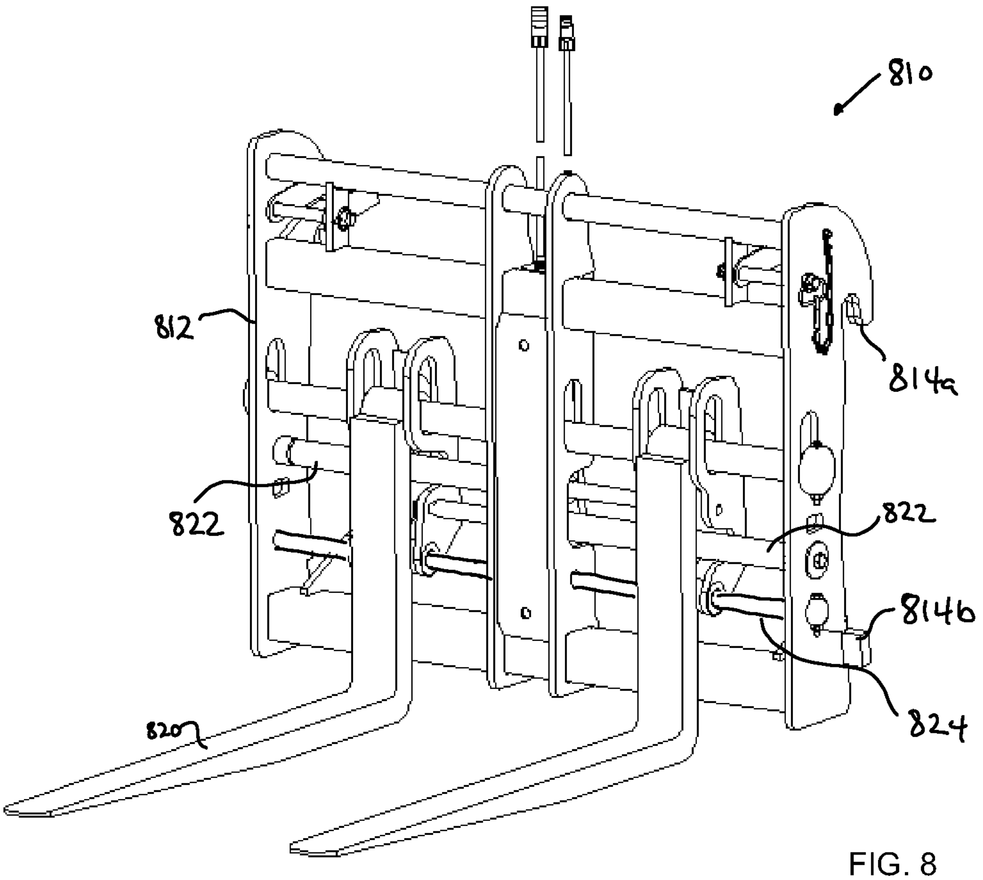

In order to help provide an unobstructed view of the forks from the operator cab 712, the first and second fork actuators 18*a*, 18*b* may be located above the attachment member 22. Hence, when engaging the forks with a load, the operator can clearly see the ends of the forks without the first and second actuators 18*a*, 18*b* obscuring the view. This is in contrast to the prior art arrangement shown in FIG. 8, where the linear actuators 818 are located behind the forks and below the attachment member 822.

An additional benefit to the fork actuators 18*a*, 18*b*, being located higher and outside of the primary field of view for the forks is that a protective panel 32 may be provided in front of the fork actuators 18*a*, 18*b* to prevent damage from foreign objects which may protrude from a load or elsewhere. The protective panel 32 may be in the form of a plate-like member which lies between a load zone in which a load is located and actuators 18*a*, 18*b*. In the embodiment shown, the protective panel 32 lies proximate to the front face 68 of the carrier 10 and may include a number of fixings 36 to allow it to be removed for inspection or maintenance purposes. The fixings 36 can take any form and may comprise a plurality of peripherally distributed bolts for example.

In order to aid the translation of the shuttles 16*a*, 16*b*, one or more guide members 38, 40, 42 may be provided. The one or more guide members 38, 40, 42 may be in the form of an elongate member(s) which extend along and define the direction of travel of the shuttles 16*a*, 16*b*. The one or more guide members 38, 40, 42 may be common to both shuttles 16*a*, 16*b* and extend the full width of the carriage 10. The one or more guide members 38, 40, 42 may comprise one or more of: an upper first guide member 38, a lower second guide member 40 and an intermediate third or further guide member 42. The optional intermediate guide member 42 may be provided between the first and second guide members 38, 40 to provide some midspan support.

The guide members 38, 40, 42 may taken any suitable form. In some embodiments, as described below, the guide members 38, 40, 42 may be elongate cylindrical rods which extend through the shuttles 16*a*, 16*b* which may comprise an optional linear bearing 44 such a bushing. Alternatively, the guide members 38, 40, 42 may comprise a planar running surface 46 against which the shuttles 16*a*, 16*b* can traverse, either directly or via a bearing element 48 such as one or more roller bearings. The guide members 38, 40, 42 may be configured to merely guide the respective shuttles 16*a*, 16*b* along the path of travel and/or form reactive members which support the fork load whilst providing a guide for lateral movement of the shuttles 16*a*, 16*b*. The guide members 38, 40, 42 may be solid or hollow and attached to the frame 12 using any suitable technique.

In the embodiment shown, a first guide member 38 is provided above the attachment member 22 and behind the protective panel 32 so as to guard against from damage during use. The first guide member 38 may be above and/or proximate the first and second fork actuators 18*a*, 18*b* so as to provide support local to the driving force. As noted above, the first guide member 38 may comprise an elongate member which extends between the lateral edges of the carrier 10 and engages with each of the first and second shuttles 16*a*, 16*b* via respective linear bearings in the form of bushes 44.

A second guide member 40 may be provided at the lower end of the first and second fork shuttles 16*a*, 16*b* and may form a structural member of the carrier frame 12. The second guide member 40 may be configured to restrict rearwards movement of the forks under load which would otherwise tend to pivot rearwards about the attachment member 22. The second guide member 40 extends between first and second side members 50 of the carrier frame 12 and comprise a planar running surface 46 against which the lowermost portion of the shuttles 16*a*, 16*b* traverse when shifting laterally. In the embodiment shown, the running surface 46 comprises a planar surface which receives a pair of roller bearings 48 for each shuttle 16*a*, 16*b*. However, this is not a limitation and the shuttles 16*a*, 16*b* may be configured to move along the running surface 46 via a sliding contact, for example, via a wear pad or the like. Further, the running surface 46 may be curved.

The bearing elements 48 are located laterally outside of a shuttle housing 52 which receives the forks. A rear surface of the bearing elements 48 which engages with the running surface 46 is provided proud of the rear surface of the shuttle housing 52 such that the latter does not foul whilst shifting sideways under the influence of the fork actuator 18*a*, 14*b*. The bearing elements 48 may be located between uppermost and lowermost flanges which extend outwardly from the first and second shuttle side walls 54, 56 which make up the shuttle housing 52. The front surface of the bearing elements 48 is exposed to the front of the carrier 10 in the embodiment shown, however, this is not a limitation and they may be housing in a protective enclosure in other embodiments. A partial enclosure is shown on the lateral flanks of the bearing elements 48.

An intermediate third guide member 42 is be provided approximately equidistantly between the first and second guide members 38, 40 and proximate to the attachment member 22. The third guide member 42 may be similar to the first guide member 38 in form and comprise an elongate cylindrical member which extends laterally across the carrier 10 and engages with the first and second shuttles 16*a*, 16*b* via linear bearings 44 in the form of bushings. However, this is not a limitation and the third guide member 42 may comprise a running surface for a rolling or sliding contact with a bearing element of the shuttle, rather than an annular linear bearing such as a bushing.

The third guide member 42 may be proximate to the attachment member 22 to provide local support at the principal vertical loading point. In the embodiment shown, the third guide member 42 is provide proximal to the underside of the attachment member 22 and set aft thereof such that the larger more robust attachment member 22 can provide some mechanical protection from foreign objects which may protrude from a load.

As noted, the diameter of the attachment member 22 may be substantially larger than either the first or the third guide member 42 by virtue of the structural role it performs.

The shuttles 16*a*, 16*b* extend generally vertically between the uppermost first guide member 38 and lowermost second guide member 40 with the respective fork actuators 18*a*, 18*b* and intermediate guide member 42, located therebetween. The first and second shuttles 16*a*, 16*b* may be substantially identical.

The housing 52 may comprise provided a first wall 54 and a second wall 56 which define a pocket therebetween in which the fork can be received to restrict free lateral movement thereof. An upper portion of the fork housing 52 provides access to the attachment member 22 such that a fork can be slotted in and lowered down on to the attachment member 22 so as to be suspended therefrom. As noted above, the fork actuators 18*a*, 18*b* and protective panel 32 are located above the attachment member 22 with sufficient clearance so that the upper end of the forks can be readily positioned over the respective attachment member 22.

The housings 52 may be provided with a rear wall 58 which extends between the side walls 54, 56. The rear wall 58 may extend partially along the vertical length of the housings 52 and provide some rigidity to the construction. The rear wall 58 provides a platform against which the fork can reside to prevent rearward movement and allow the horizontal load of the fork to carried by the bearing elements 48.

In the embodiment shown, the rear wall 58 is proximate an upper surface of the lower guide 40 and extends upwardly therefrom. The rear wall 58 sits slightly forwards of the running surface 46 to provide sufficient clearance for the rear side of the fork.

The attachment member 22, first and third guide members 38, 42 extend through the shuttle housing 52 via respective apertures with the bushings 44 being provided therein. The attachment member 22 passes through with suitable clearance to prevent contact between the two.

It will be appreciated from the above that the weight of the shuttles 16*a*, 16*b* is carried by the first and third guide members 38, 42, whilst the forks and fork load are carried by the attachment member 22 and horizontally reacted by the lowermost guide member 40. As such, the first and third guide members 38, 42 may require significantly lower strength and be sized accordingly. Hence, the first and third guide members 38, 42 are shown as having a smaller diameter than the attachment member 22.

It will be appreciated that although the forks attach directly attached to the attachment member 22 in the embodiment shown, this need not be the case and a sleeve may be incorporated into the shuttle housing around which the fork can be attached. In such an arrangement the fork load would be carried by the shuttle housing and so further support may be provided, such as a bearing between the attachment member and shuttle 16*a*, 16*b*.

The carrier frame 12 may comprise any arrangement of structural members to provide the required strength and rigidity. In the embodiment shown, the frame 12 is constructed from first and second side members 50 which extend vertically and define the lateral edges of the carrier 10. As shown, a number of bosses and attachments may be provided on the exterior of the first and second side members 50.

A plurality of structural cross-members span horizontally between the first and second side members 50. Uppermost is a top cross-member 60 which extends between the terminal ends of the side members 50. Lowermost is the second guide member 42. An intermediate structural cross-member 62 extends between the first and second side members 50 in the vicinity of the first guide member 38 and the fork actuators 18*a*, 18*b* and provides support for the protective panel 32. More specifically, in the embodiment shown, the intermediate structural cross-member 62 is located in front of the first guide member 38 and above the fork actuators 18*a*, 18*b*, the former having a reduced diameter to accommodate the depth of the intermediate structural member 62. The attachment member 22 may be considered to be a fourth structural member.

A central vertical member 64 extends between the bottom cross-member 40 and the intermediate cross-member 62 and provides a front platform against which a load can rest. The fork actuators 18*a*, 18*b*, first and third guide members 38, 42 and attachment member 22 all extend through the central member 64, with the guide members 38, 42 and attachment member 22 all optionally being attached thereto to provide additional support.

A plurality of vertical sub-members 66 may extend between the upper cross-member 60 and intermediate cross-member 62. The sub-members 66 may be equidistantly spaced across the width of the carrier 10.

The coupling portion may comprise first and second coupling side attachments 14*a*, 14*b* which are provided outboard of the shuttles 16*a*, 16*b* so as to help improve visibility of the fork pick-ups. In the embodiment shown, side attachments 14*a*, 14*b* are provided on the frame side members 50. Each side attachment 14*a*, 14*b* may comprise an upper and lower attachment point which is configured to receive a corresponding attachment mechanism on the terminal end of the working arm of the material handling machine. The coupling used in the present disclosure may be conventional and comprise a hook attachment at an upper end thereof, and an aperture for slidable receiving a locking pin at a lower end thereof. Other forms of coupling portion may be used with the carriage of the present disclosure. For example, although the coupling portion shown in the drawings comprises a quick coupling, other couplings which are not hydraulically operated or ones which require one or more fixings, e.g. bolts, to attach the carriage to a machine may be used.

A front face 68 of the carrier 10 may provide a plane against which the load can sit in use, particularly when the carriage 10 and load is inclined rearwards slightly for transportation. Any of the structural members 50, 60, 62, 64, 66, the shuttles 16*a*, 16*b* and the protective panel 32 may comprise a front surface which contributes to the planar surface.

A advantage of the carrier 10 of the present disclosure is that it provides improved line of sight for an operator located in the operator cab 712 of the material handling machine 701. This is because the actuators 18*a*, 18*b* and first guide members 38 have been moved from the area below the attachment member 22. Thus, there is provided a relative clear window 70 through which an operator can view the forks when engaging with a load. In the embodiment shown, the window 70 is defined by the attachment member 22, lower guide member 42 and side members 50, with only the shuttles 16*a*, 16*b* and intermediate guide member 42 being located therein. It will be appreciated that although the central member 64 extends vertically through the window 70, this is unlikely to obscure the view of the fork ends, particularly as the shuttles 16*a*, 16*b* cannot pass the central member 64. It will also be appreciated that the intermediate guide member 42 may be moved upwards to be at the rear of or above the attachment member 22 in some embodiments. However, the positioning of the guide member 42 below the attachment member 22 helps avoid damage when mounting the forks.

As best seen in FIG. 1, a valve block 72 is provided on a rear side of the carrier 10, specifically, between the upper and intermediate cross-members 60, 62. The valve block 72 is shown and described as a single block, however, it will be appreciated that the hydraulic switching provided by the valve block may be achieved between disparate valves or valve blocks in some embodiments.

The valve block 72 shown in the embodiment comprises a plurality of ports 74 which are connected to respective hydraulic hoses either to connect the valve block 72 to the working machine 701 as a source of pressurized hydraulic fluid, or to the first and second fork actuators 18*a*, 18*b*.

As noted above, the first and second fork actuators 18*a*, 18*b* may be operable to position the forks relative to one another so that the distance therebetween can be adjusted to suit different loads having different pick-up points. In some embodiments, the fork actuators 18*a*, 18*b* may be operated in unison such that the forks can be mutually side shifted to preserve their relative position. Hence, in use, an operator can operate the carrier 10 in a first mode in which the forks can be positioned relative to each other, and a second mode in which the forks can be side shifted unidirectionally in unison.

The first mode may comprise individual independent control of the first and second fork actuators 18*a*, 18*b*, or may comprise both of the first and second fork actuators 18*a*, 18*b* being operated in simultaneously in opposing directions such that the forks either move closer together or further apart on either side of the carrier centreline.

Figure 5:
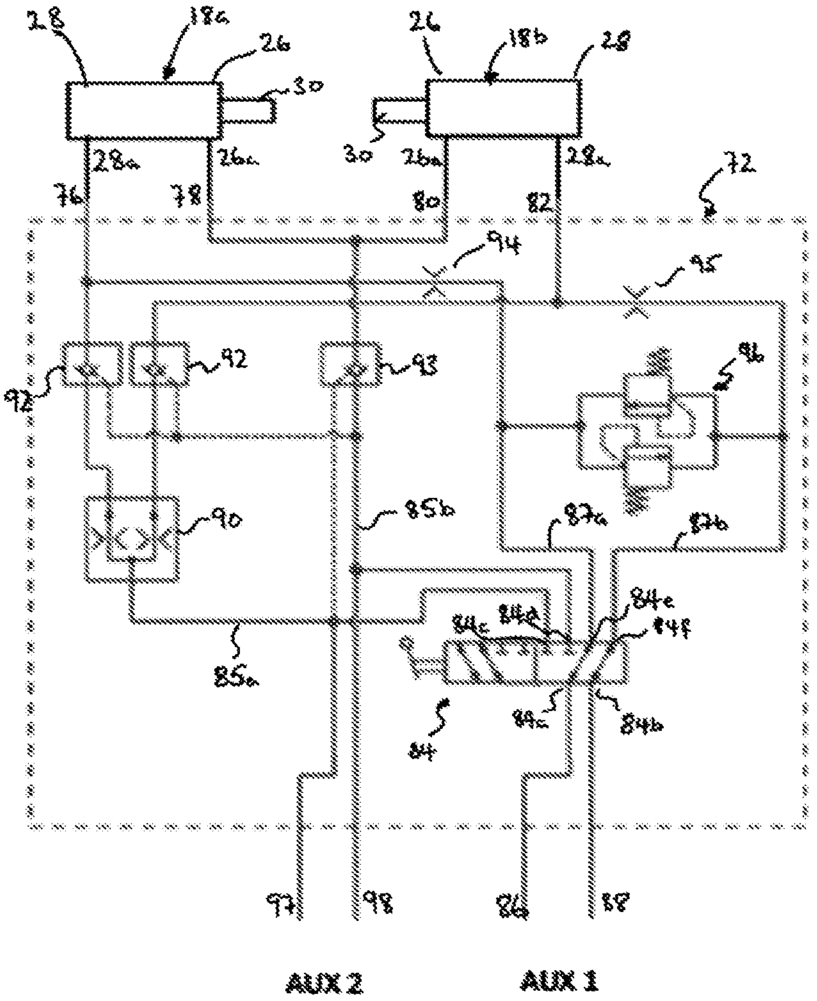
FIG. 5 shows a schematic diagram of a hydraulic system used to control the carriage according to the present disclosure.

FIG. 5 shows a schematic diagram of a hydraulic system 500 for the carrier 10 according to an embodiment of the present disclosure. The hydraulic system 500 may comprise the valve block 72 having input ports Aux 1, Aux 2 which may be connected to the working machine, and output ports 76, 78, 80, 82 which connect to the fork actuators 18*a*, 18*b* and a manually operated valve 84.

The input ports Aux 1, Aux 2, may be connected to respective first and second auxiliary connections of the working machine which are controlled from suitable operator controls from within the operator cab 712. The first and second auxiliary connections may provide actuating hydraulic flows and be referred to herein as actuating hydraulic flow lines. The actuating hydraulic flow lines may comprise a pressure line and a return line as determined by the flow direction selected by an operator. Providing the flow in a first direction may result in an extension of a fork actuator, whilst providing flow in an opposing second direction may result in a retraction of a fork actuator, as well known in the art.

Advantageously, the valve block 72 is configured to operate using either single or dual auxiliary hydraulic feeds, depending on the machine 701 to which it is connected. When connected to a machine 701 which includes only a single auxiliary feed, the valve block 72 may be used to manually switch between first and second modes. Hence, when a changeover valve 84 is placed in a first position corresponding to the first mode, the actuators 18*a*, 18*b* are operable to move towards each other or away from each other depending on the flow direction of the feed. When the changeover valve 84 is placed in the second position corresponding to the second mode, the actuators 18*a*, 18*b* are operable to move in unison in a common direction, thereby side-shifting whilst maintaining their relative position.

When used with a dual auxiliary hydraulic feed, a first feed associated with a first operator control may be used to provide the first mode, and the second feed associated with a second operator control may be used to provide the second mode. It will be appreciated that the use of the changeover valve 84 is not required when the two auxiliary feeds are provided.

The operation of the hydraulic system 500 will first be described for a single auxiliary feed. The first auxiliary feed comprise a first hydraulic line 86 and a second hydraulic line 88. The first and second hydraulic lines 86, 88 may be controlled from the working machine 701 to provide a flow of pressurised hydraulic fluid in a chosen flow direction depending on the movement required from the forks. Thus, line 86 may be a pressure line and line 88 a tank (return) line when the forks are moved in a first direction, with the line 88 being the pressure line and line 86 being the tank line when the forks are required to move in the opposite direction. The provision and control of the hydraulic feeds within the material handling machine 701 are conventional and not discussed further herein.

The changeover valve 84 may be a 6/2 spool valve with inlet ports 84*a*, 84*b* connected to lines 86 and 88 of the Aux 1 feed. Ports 84*c* and 84*d* may be referred to as first mode hydraulic ports which connect to the first and second fork actuators 18*a*, 18*b*, via first mode hydraulic lines 85*a*, 85*b*. The first and second hydraulic lines 85*a*, 85*b* connect to the cap end ports 28*a* and rod end ports 26*a* respectively and may be configured to be either a pressure line or return line depending on the chosen direction of flow/actuation.

Ports 84*e* and 85*e* may be referred to as second mode first and second hydraulic lines 87*a*, 87*b* and connect to the cap end ports 28*a* of the first and second fork actuators 18*a*, 18*b*. The first and second hydraulic lines 87*a*, 87*b* may be configured to be either a pressure line or return line depending on the chosen direction of flow/actuation.

Port 84*c* is connected to the cap end ports 28*a* of both the first and second fork actuators 18*a*, 18*b* via lines 85*a* which includes a flow divider 90 and respective pilot operated check valves 92 provided downstream of the divider 90. Port 84*d* is connected to the rod end ports 26*a* of both the first and second fork actuators 18*a*, 18*b* via line 85*b* via a pilot operated check valve 93.

Port 84*e* connects to the cap end port 28*a* of the first fork actuator 18*a* via lie 87*a* which comprises a flow restrictor 94 in the form of an orifice. Port 84*f* connects to the cap end port

28*a* of the second fork actuator 18*b* via line 87*b* which comprises a flow restrictor 95 in the form of an orifice. The rod end ports 26*a* of the first and second fork actuators 18*a*, 18*b* are connected in series via an interconnecting line 85*c* which connects to the first mode hydraulic line 85*b* via the pilot operated check valve 93. Hence, when the check valve 93 is closed, there is provided a series hydraulic connection between the rod end ports 26*a* of the two cylinders meaning an actuating hydraulic flow provided at one of the cap end ports 28*a* will flow through both cylinders 18*a*, 18*b* and return via the other cap end port 28*a* having passed through the rod end chambers and line 85*c*.

More specifically, ports 84*c* 84*d* provide the first mode operation in which the fork actuators receive identical flows at the cap end ports 28*a* from port 84*c* and corresponding opposing flows via port 84*d* at the rod end ports 26*a* to either extend or retract the shafts 30, thereby providing bidirectional movement of the forks in unison. This corresponds to the first switch position when the spool is shifted right (not shown). Ports 84*e*, 84*f* provide the second mode of operation in which the hydraulic feed is directed into one or other of the cap end ports 28*a* which pushes the corresponding piston towards the rod end 26. As the rod ends 26 are connected in hydraulic series, the other of the fork actuators 18*a*, 18*b* is moved in a corresponding direction with a flow returning from the cap end port 28*a* which did not receive the flow. Hence, both the first and second shuttles 16*a*, 16*b* may be side-shifted unidirectionally in unison. It will be appreciated that the choice of flow direction will determine the direction of the side shift.

Also shown is a pair of pressure relief valves 96 arranged in anti-parallel between ports 84*d* and 84*e*. The pressure relief valves 96 are configured to restrict the pressure when operating in the second mode and help reduce pressure intensification which may occur when the changeover between first and second modes is operated repeatably, trapping pressure. The pressure relief valves 96 may also be configured to protect the circuit from excessive pressures which may inadvertently be provided depending on the machine to which it is connected.

The pilot operated check valves 92, 93 are configured to control the flow return when operating in the first and second modes. Thus, when operating in the second mode, the pilot valves are closed such that the flow extends to or from port 84*e* from or to port 84*f* through both fork actuators 18*a*, 18*b* in series. When operating in the first mode, hydraulic fluid extends through the fork actuators 18*a*, 18*b* in opposing directions, that is, simultaneously into the cap end 28 and out of the rod end 26 or vice versa. Hence, in the first mode, the feed line is used to open the check valve 92 or 93 in the opposing returning line. Hence, port 84*c* is used to pilot the check valve 93 in the port 84*d* line when port 84*c* is the pressure line, and port 84*d* is used to pilot check valve 92 in port 84*c* line when port 84*d* is the pressure line. As such, flow return can be provided to the lines connected between the rod end 26 and port 84*d*, and the cap end 28 and port 84*c*, depending on flow direction.

When two auxiliary feeds are used, the second auxiliary feed lines 97 and 98 is connected to the lines which extend between and replace the lines connecting the rod end 26 and port 84*d*, and the cap end 28 and port 84*c* respectively. Hence, leaving the changeover valve 84 in the second position as shown in FIG. 5, it is possible to control the first mode with the Aux 2 feed, and the unidirectional side-shift with Aux 1.

More specifically, for the first mode, when moving the forks together with a single feed Aux 1, the changeover spool is moved to the right and an actuating flow directed to enter port 86 via the operator controls. Hydraulic pressure is then provided to the cap end ports 28*a* of the first and second fork actuators 18*a*, 18*b* via port 86*c* and the flow divider 90 to provide simultaneous extension. The hydraulic pressure in the port 84*c* line pilots check valve 93 open so that the return flow from the rod end ports 26*a* is provided to port 84*d* of the valve block 72. When the flow is reversed between ports 84*c* and 84*d*, the actuating flow is provided in the opposite direction and the rods 30 retract. To switch to mode 2, the operator manually moves the changeover valve 84 into the second position (as shown), and the actuating flow is provided to port 84*e*, such that the cap end port 28*a* of the first fork actuator receives pressurised fluid to provide extension. As the check valves 92, 93 do not receive pilot pressure they remain closed and the flow returns to port 84*f* through the second cap end port 84*f* by virtue of the series connected rod ends 26. It will be appreciated that switching the flow direction will cause the shift direction in each of the actuators to change accordingly.

When a second auxiliary feed is used, the changeover valve 84 remains in the second position (shown in FIG. 5). An operator provide an actuating hydraulic flow to port 97 such that hydraulic pressure is provided to the cap end ports 28*a* of the first and second fork actuators 18*a*, 18*b* via the flow divider 90 and check valves 92 to provide simultaneous extension. The hydraulic pressure in the port 97 line pilots check valve 93 open so that the return flow from the rod end ports 26*a* to port 98 of the second auxiliary feed. When the flow is reversed between ports 97 and 98, the actuating flow is provided in the opposite direction and the rods 30 retract. The second mode is controlled via the second auxiliary feed as previously described above for the single auxiliary connection.

Figure 6:
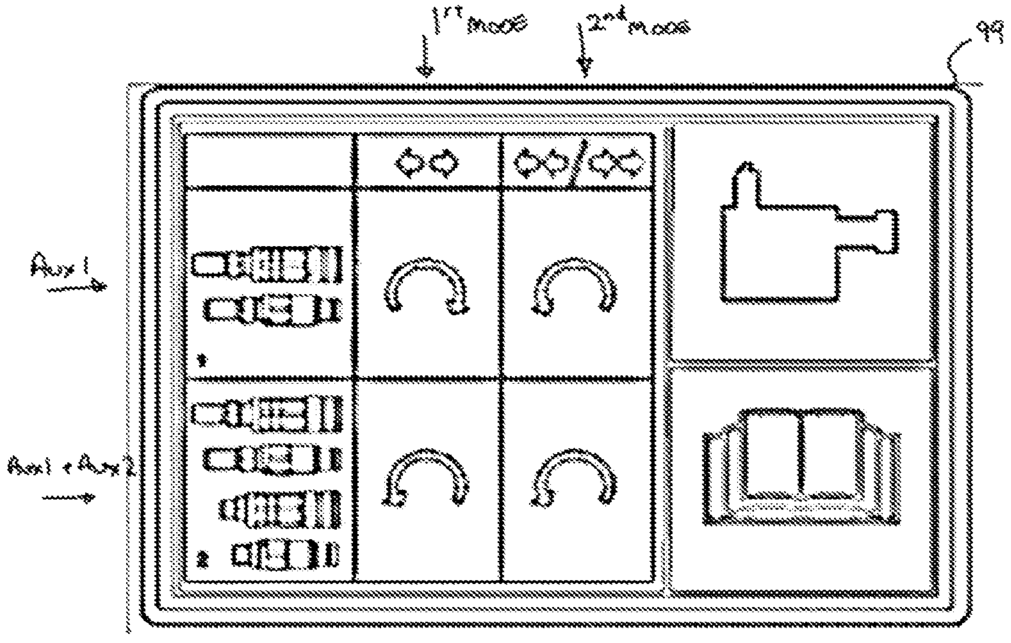
FIG. 6 shows a decal for providing operator instructions according to the present disclosure.
Figure 7:
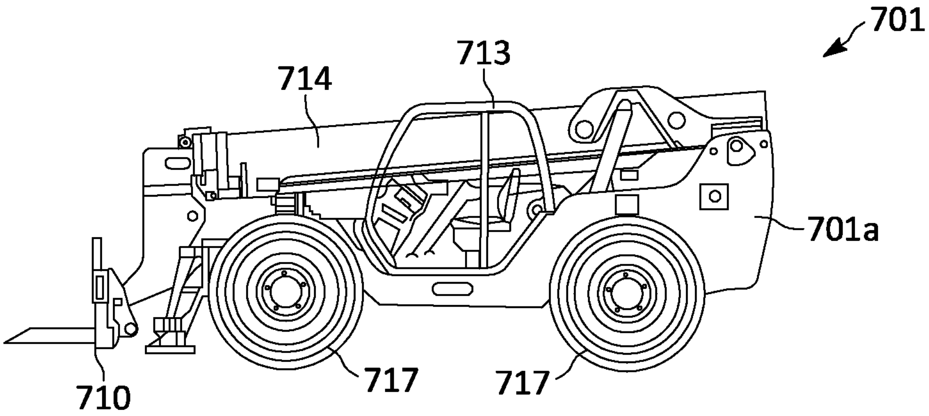
FIG. 7 shows a material handling machine according to the present disclosure; and, FIG. 8 shows a prior art side-shifting fork carriage.

FIG. 6 shows a decal 99 which may be provided adjacent to the valve block 72. The decal provides an indication to an operator of the valve position for the changeover valve when operating in a dual line mode in which the two auxiliary feeds are connected (bottom boxes), and a single line mode in which only one auxiliary feed is connected. As can be seen, the decal indicates that the changeover valve is switched over between the bidirectional first mode (left hand column) and the unidirectional second mode (second column when only one feed line is connected, and remains in the second mode position when in dual feeds are connected.

The present disclosure provides a carriage 10 which there is provided improved visibility by moving the first and second fork actuators 18*a*, 18*b* above the attachment member 22. A further advantage is provided by placing the first and second actuators 18*a*, 18*b* behind a protective panel 32.

The carriage 10 is particularly advantageous as the forks may be moved under load due to the presence of the lower guide member 40 having a running surface 46 and bearings located on the fork shuttles 16*a*, 16*b*.

A yet further advantage of the carriage 10 of the present disclosure is ability to operate using one or two auxiliary feeds provided by the material handling machine to which the carriage is attached. This provides additional functionality and versatility to the carriage.

It will be appreciated that the present disclosure contemplates each of these advantageous features as being mutually exclusive in many ways and that may be employed in isolation or various combinations in some embodiments. For example, a carriage may include the advantageous positioning of the fork actuators above the attachment member without one or more of the use of the protective panel, the bearing elements or the dual feed capability. Similarly, as another example, the carriage may be provided with the bearing elements to aid side-shifting under load, without the use of one or more of the higher positioning of the fork actuator, the protective panel or the dual feed capability. It will be appreciated that other combinations are possible.

Figure 9:
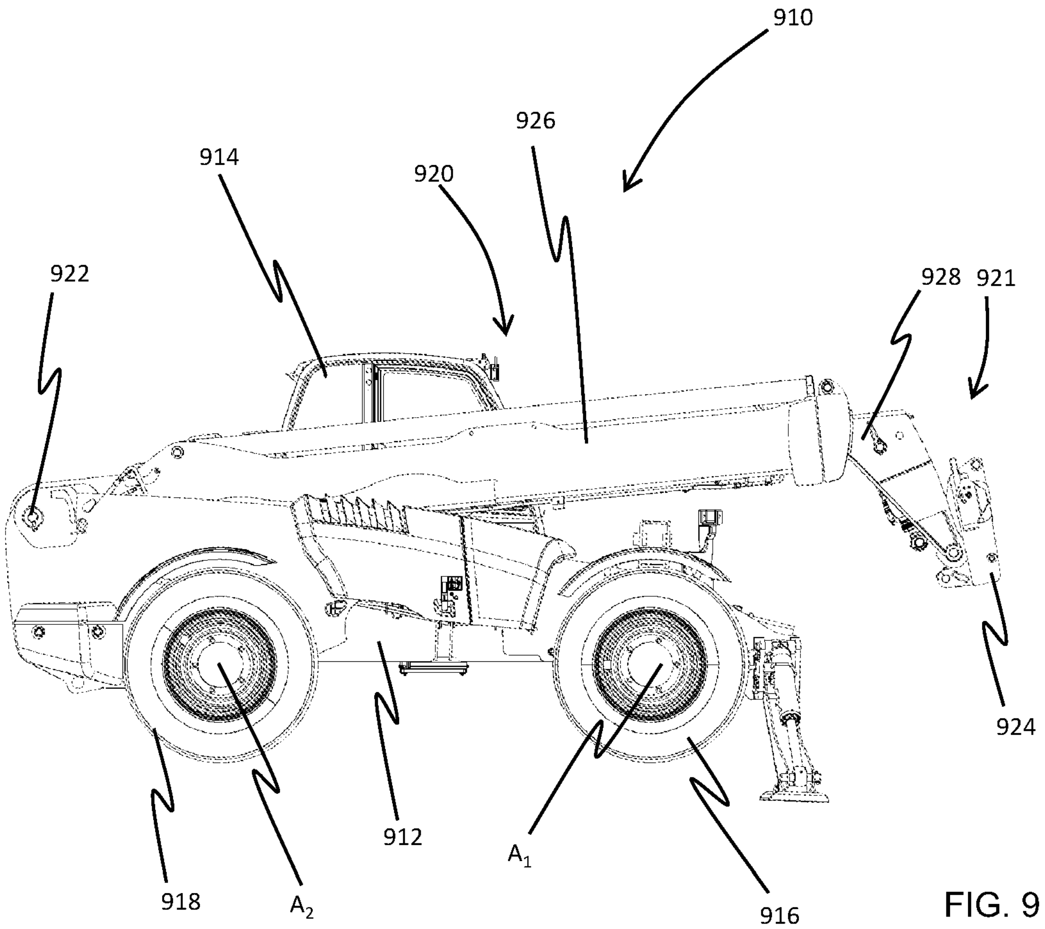
FIG. 9 is a side view of a working machine including a carriage according to an embodiment.
Figure 10:
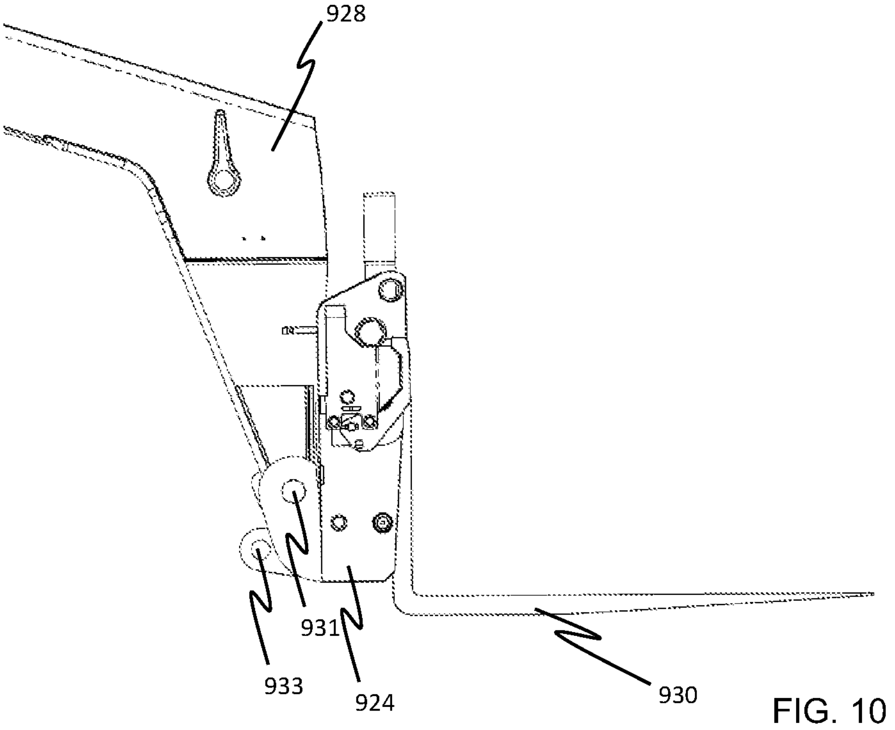
FIG. 10 is an enlarged side view of the carriage of FIG. 9.
Figure 11:
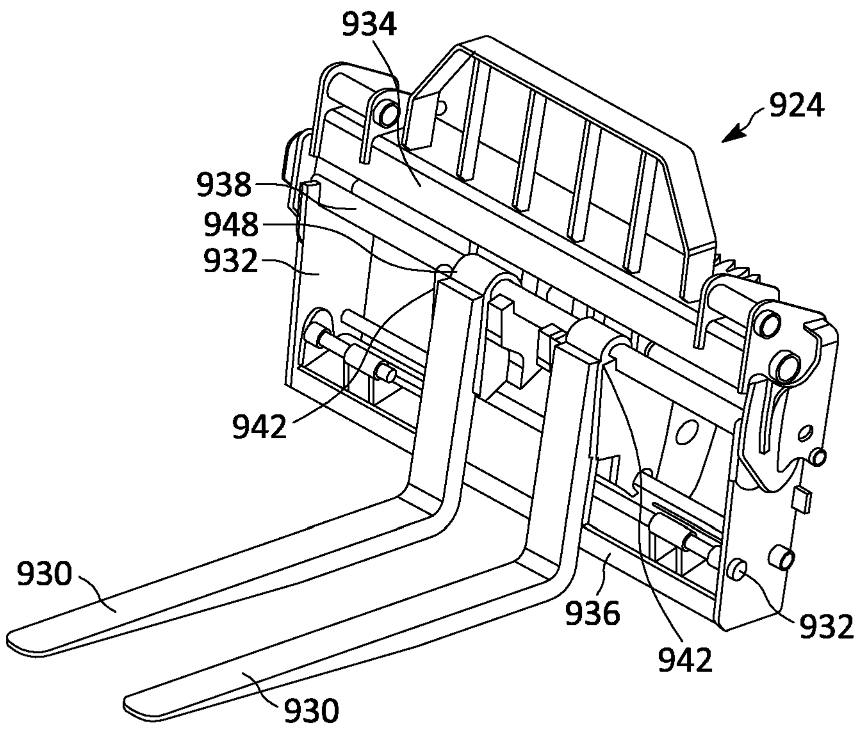
FIG. 11 is a front isometric view of the carriage of FIG. 9.

Referring now to FIG. 9, an embodiment of the teachings includes a working machine 910. The working machine may be a load handling machine. In this embodiment, the load handling machine 910 is a telescopic handler. In other embodiments the load handling machine 910 may be a rotating telescopic handler, a forklift, a skid-steer loader, a compact track loader, a wheel loader, or a telescopic wheel loader, for example. Such working machines may be denoted as off-highway vehicles. The working machine 910 includes a machine body 912. The machine body 912 may include, for example, an operator's cab 914 from which an operator can operate the machine 10. The working machine 910 has a ground engaging propulsion arrangement. The ground engaging propulsion arrangement or structure supports the body 912. A working arm 920 is pivotally connected to the body 912. The working arm 920 is connected to the body 912 by a mount 922 proximate a first, or proximal, end of the working arm 920.

In some arrangements, the body 912 may include an undercarriage or chassis including the ground engaging propulsion arrangement, and a superstructure including the cab and arm, and the superstructure may be rotatable (e.g. about a substantially vertical axis) relative to the undercarriage/chassis. Put another way, the superstructure may be rotatable relative to the ground engaging propulsion structure.

The ground engaging propulsion structure includes a first, or front, axle A1 and a second, or rear, axle A2, each axle being coupled to a pair of wheels 916, 918. In other embodiments, the ground engaging propulsion structure may include a pair of endless tracks. One or both of the axles A1, A2 may be coupled to a drive arrangement (not shown) configured to drive movement of the ground engaging propulsion structure (i.e. the axles A1, A2). The drive arrangement causes movement of the working machine 10 over a ground surface. The drive arrangement includes a primer mover and a transmission. The prime mover may be an internal combustion engine, an electric motor, or may be a hybrid comprising both an internal combustion engine, an electric motor.

The working arm 920 may be a telescopic arm, having a first section 926 connected to the mount 922 and a second section 928 which is telescopically fitted to the first section 926. In this embodiment, the second section 928 of the working arm 920 is telescopically moveable with respect to the first section 926 such that the working arm 920 can be extended and retracted. Movement of the second section 928 with respect to the first section 926 of the working arm 920 may be achieved by use of an extension actuator (not shown), for example a double acting hydraulic linear actuator, an electric linear actuator, a telescopic extension ram, multiple extension rams, and/or a chain and pulley system. As will be appreciated, the working arm 920 may include a plurality of sections, for example two, three, four or more sections. Each arm section may be telescopically fitted to at least one other section, and an actuator may be provided therebetween.

The working arm 920 can be moved with respect to the machine body 912 and the movement is preferably, at least in part, rotational movement about the mount 922. The rotational movement is about a substantially transverse axis of the machine 910. Rotational movement of the working arm 920 with respect to the machine body 912 is, in an embodiment, achieved by use of at least one lifting actuator (not shown) coupled between the arm 920 and the body 912.

A carriage 924 is mounted to a second, or distal, end 921 of the working arm 920. A working implement, e.g. a load handling implement, 930 is mounted to the carriage 924. The working machine 910 is configured to transport loads over uneven ground, i.e. with a load held by the working implement 930, an operator controls the ground engaging propulsion structure to move the machine 910 with the load from one location to another.

Figure 18:
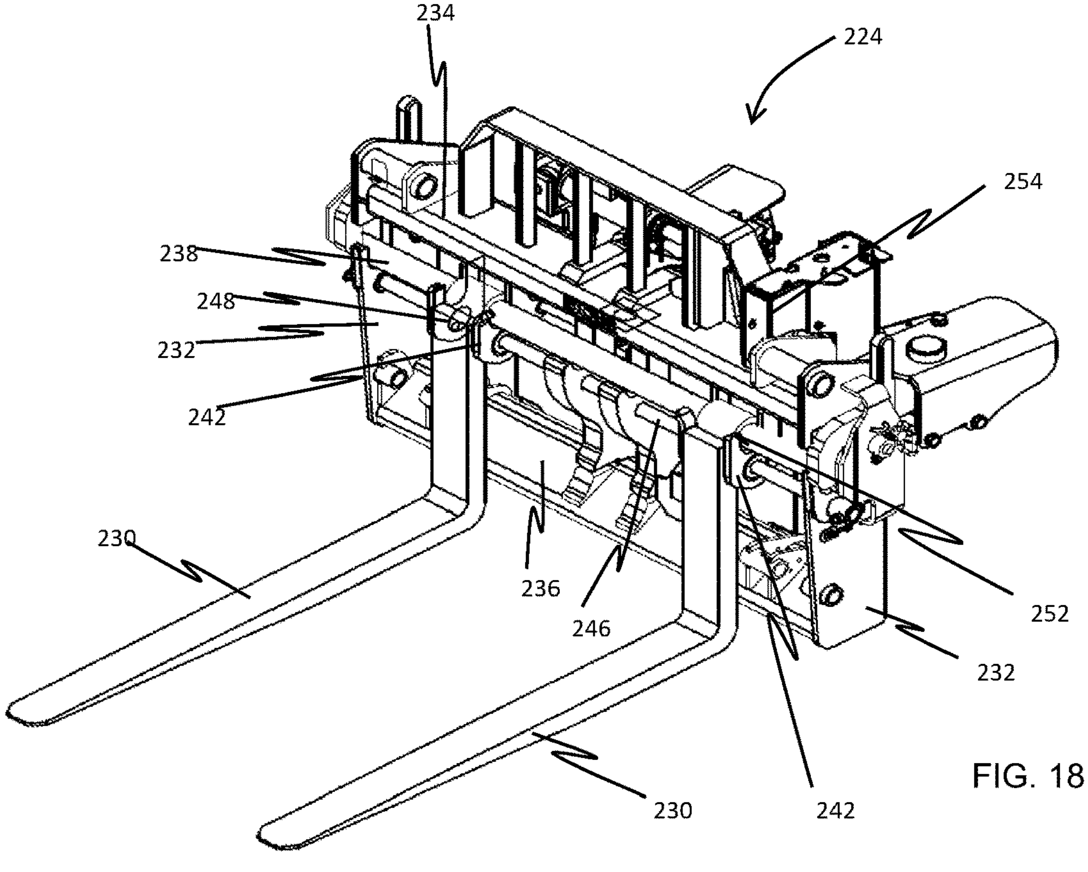
FIG. 18 is a front isometric views of a carriage assembly including the carriage of FIG. 16.
Figure 19:
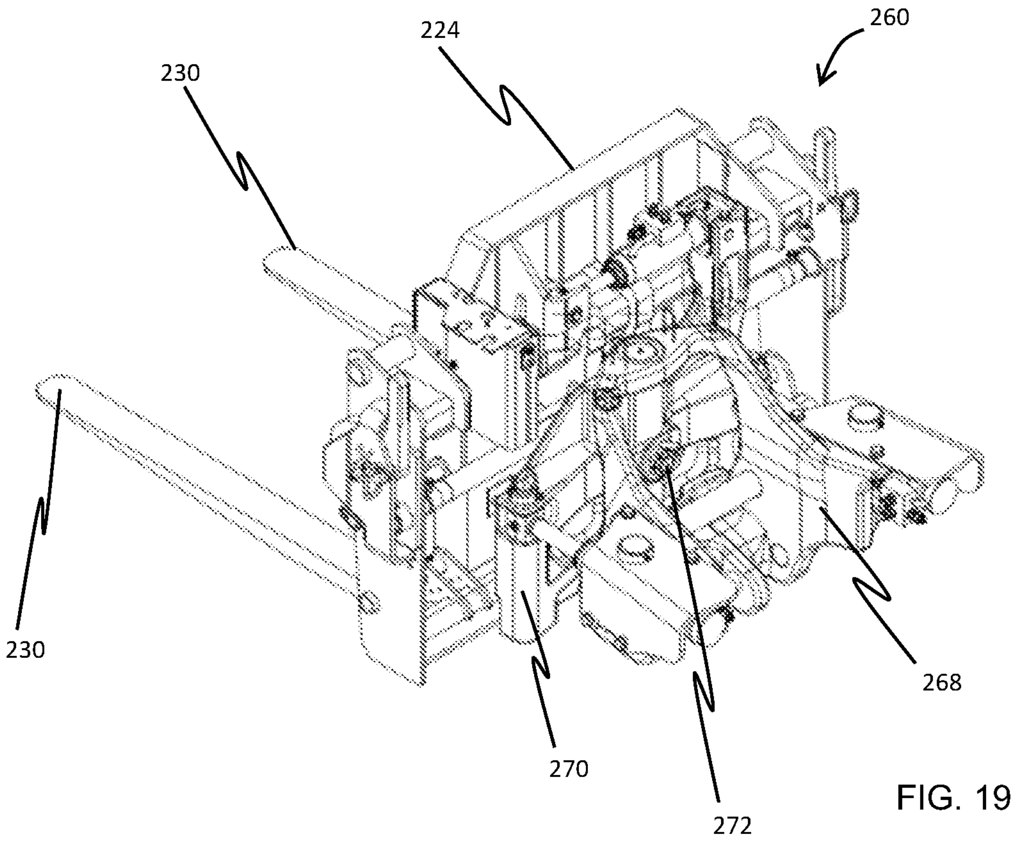
FIG. 19 is a rear isometric view of the carriage assembly of FIG. 18.
Figure 20:
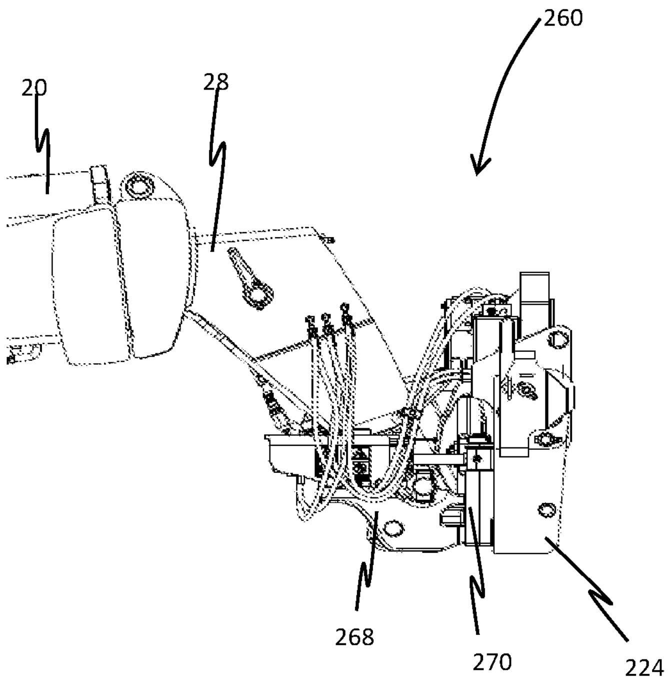
FIG. 20 is a side view of the carriage assembly of FIG. 18 mounted to the end of a working arm of a working machine.

Referring now to FIGS. 18 to 20, the carriage 924 is illustrated in more detail, and includes two side members 932, an upper cross member 934 extending between the side members 932, and a lower cross member 936 extending between the two side members 932.

The carriage 924 is provided with an implement mount comprising a fork mounting shaft 938. The fork mounting shaft 38 extends between the two side members 932. In the illustrated arrangement, the working implement is a pair of forks 930, e.g. a pair of laterally spaced apart forks. The forks 930 project forwardly from the carriage assembly 924. In alternative arrangements, the working implement may be a bucket, or a basket etc. The fork mounting shaft 938 is configured for mounting the first and second forks 930 thereon to mount said forks 930 to the carriage 924. It will be appreciated that the fork mounting shaft 938 may be is releasably mounted to the carriage 924 (i.e. to the side members 932).

Figure 12:
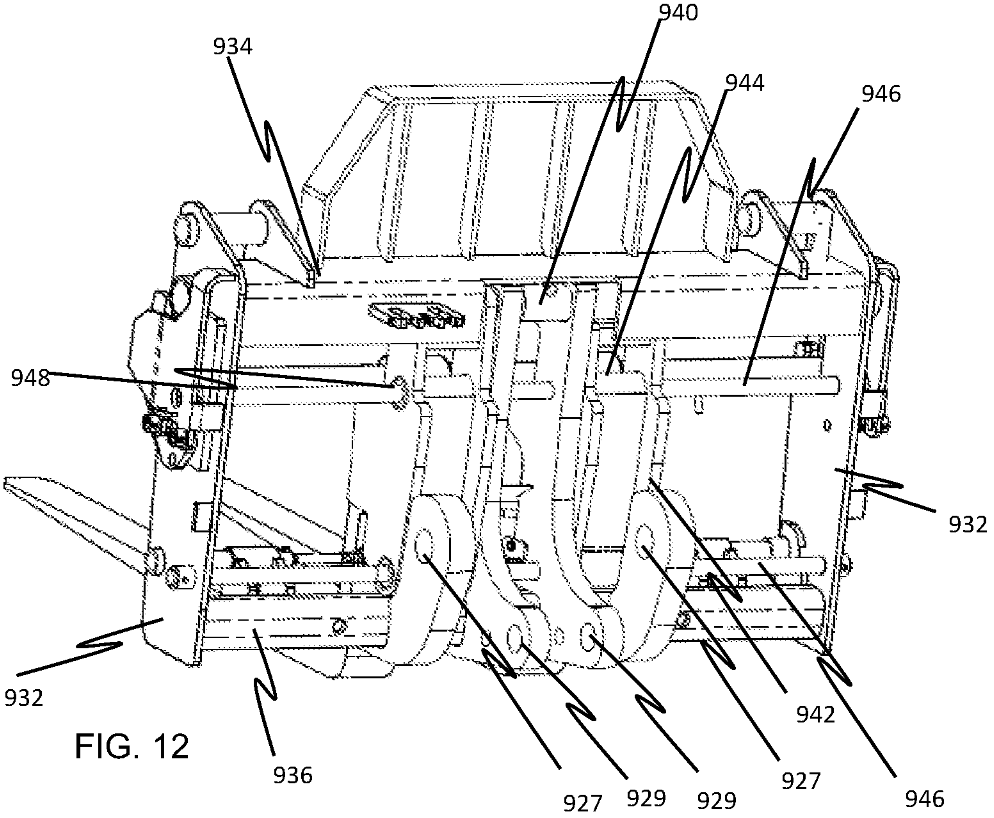
FIG. 12 is a rear isometric view of the carriage of FIG. 10.

The carriage 924 has an adjuster assembly configured to move the forks 930 on the fork mounting shaft 938. The adjuster assembly includes an actuator 940 mounted on the carriage 934. The actuator 940 is connected to a hydraulic flow path (not shown) for delivering hydraulic pressure to the actuator 940. The actuator 940 is configured to move the forks 930 on the fork mounting shaft 938. Put another way, the carriage 924 includes an integrated adjuster assembly that is able to move the position of the forks 930 on the fork mounting shaft 938 (i.e. relative to the carriage 924). As is shown in FIG. 12, the upper cross member 934 defines a recess or channel in which the actuator or actuators 940 are positioned.

The adjuster assembly includes first and second adjuster bodies 942. The adjuster bodies 942 are mounted to the carriage 924 so as to be integrated with the carriage 924. The actuator 940 is configured to move the adjuster bodies 942 in order to move the forks. Put another way, the actuator 940 moves the forks 30 via the adjuster bodies 942. In the illustrated arrangement, the carriage 924 (i.e. the adjuster assembly) includes first and second actuators 940, each configured and arranged to move one of the adjuster bodies 942. In alternative arrangements, it will be appreciated that only a single actuator 940 may be provided.

Each adjuster body 942 has a first recess 944 configured to receive at least a part of one of the forks 930 therein. The first recess 944 may define a width which tapers in a direction towards a base (not shown) of the first recess 944. A distal, i.e. upper, region 950 of the first recess 944 may be curved in some arrangements. It will be appreciated that one or both of the side walls of the first recess may be curved.

In the illustrated arrangement, the adjuster bodies 942 are slideably mounted on an adjuster shaft 946. In the illustrated arrangement, two adjuster shafts 946 are provided, but will be appreciated that only one adjuster shaft 946 may be provided in some arrangements. In further alternative arrangements, it will be appreciated that the adjuster bodies 942 may be arranged to slide along the fork mounting shaft 938. The adjuster bodies 942 include an aperture 948 therethrough configured to receive the adjuster shaft 946 therethrough. The adjuster shaft 946 is mounted between the two side members 932. The actuator 940 is configured to move the adjuster bodies 942 along the adjuster shaft 946.

Each adjuster body 942 incudes a second recess configured to receive the fork mounting shaft 38 therein. In this way, the fork mounting shaft 938 acts as a stop to prevent/limit rotation of the first and second adjuster bodies 942 about the adjuster shaft 946. In this arrangement, the first and second forks 930 are connected to the first and second adjuster bodies 942, respectively, via the fork mounting shaft 938.

The carriage 924 may include a hydraulic block (not shown) mounted thereto. The hydraulic block may be connectable to a first auxiliary hydraulic connector (not shown) of the working machine 910. It will be appreciated that the first auxiliary hydraulic connector configured for supplying hydraulic fluid to the actuator may be provided on the working arm 920 of the working machine 910.

The carriage 924 includes a valve (not shown) along the hydraulic flow path to equally distribute hydraulic flow between the first and second actuators. The adjuster assembly (i.e. the actuator or actuators 940) is configured such that, in a first mode, the first and second forks 930 are fixed relative to each when they are moved along the fork mounting shaft 938, and, in a second mode, the first and second forks 930 are moveable relative to each other about a fixed centre point. Although not illustrated, it will be understood that the working machine 910 may be provided with an operator input and a control system configured to select the first mode or the second mode based on an input to the operator input.

In the illustrated arrangement, the carriage 924 includes a mounting arrangement 925. The mounting arrangement 925 is configured to pivotally mount the carriage 924 to the working arm 920. The mounting arrangement 925 is provided in the form of first and second pairs of opposing apertures 927, 929 to receive first and second tilt pins 931, 933 therethrough.

Figure 13:
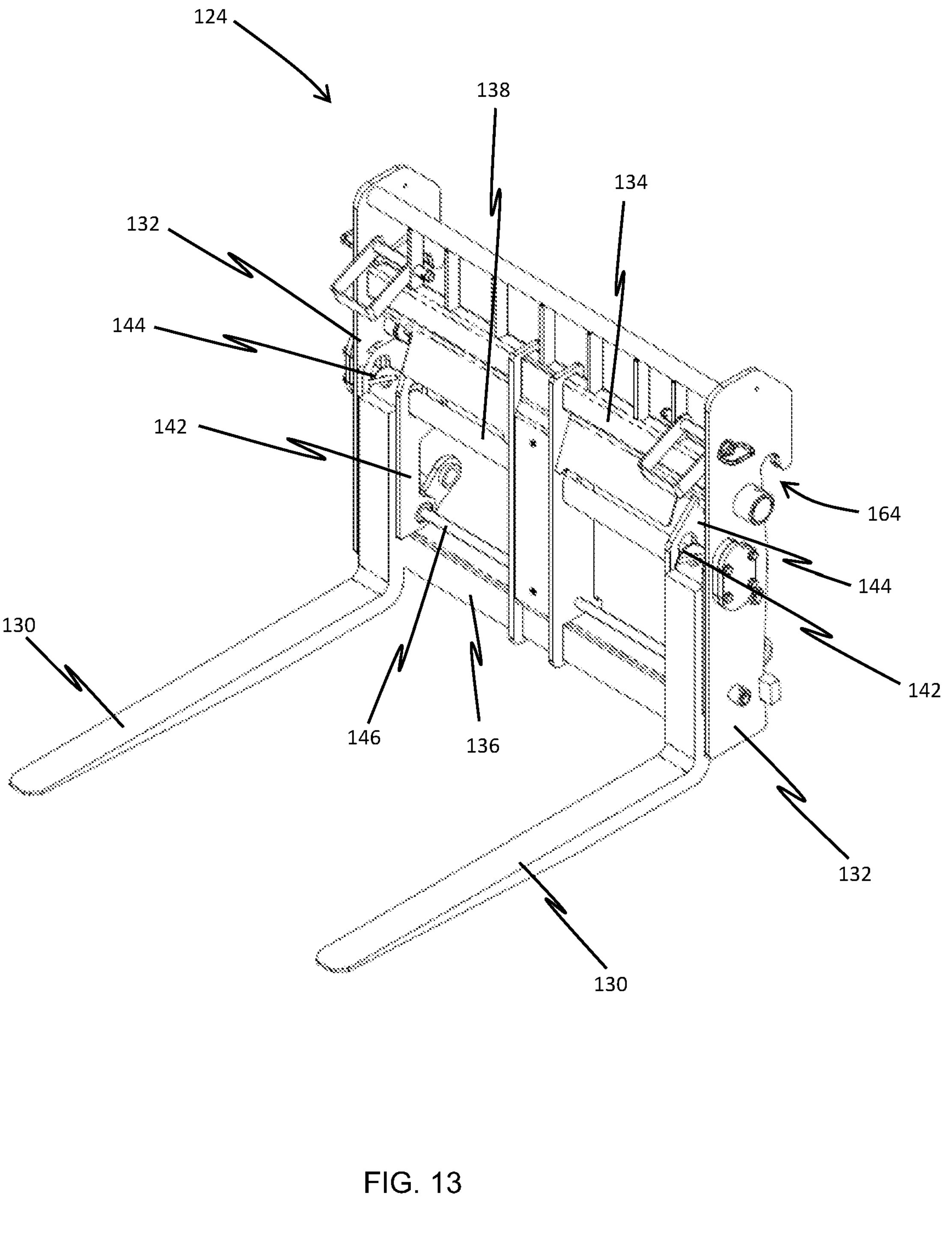
FIG. 13 is a front isometric view of a carriage according to an embodiment.
Figure 14:
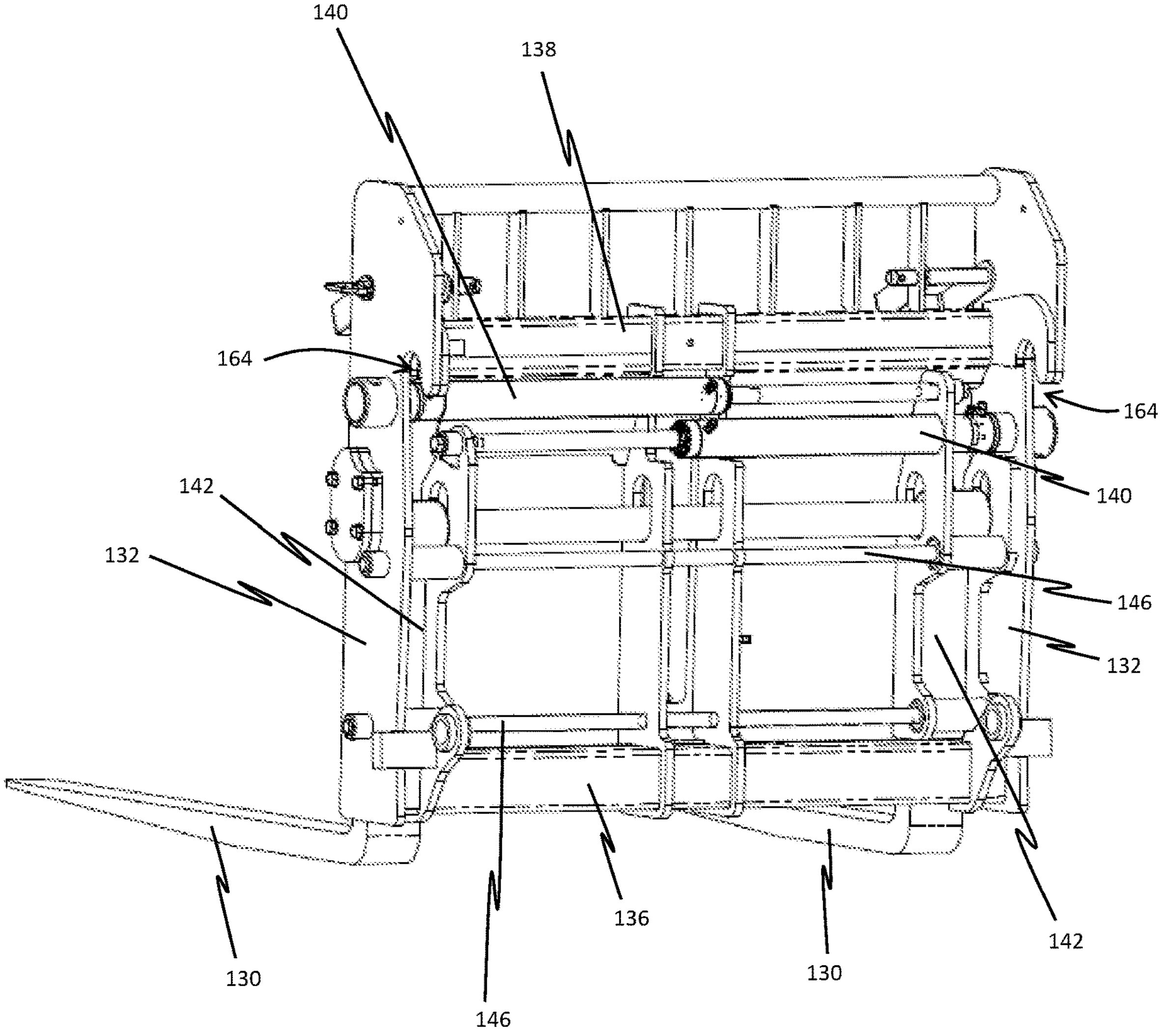
FIG. 14 is a rear isometric view of the carriage of FIG. 13.
Figure 15:
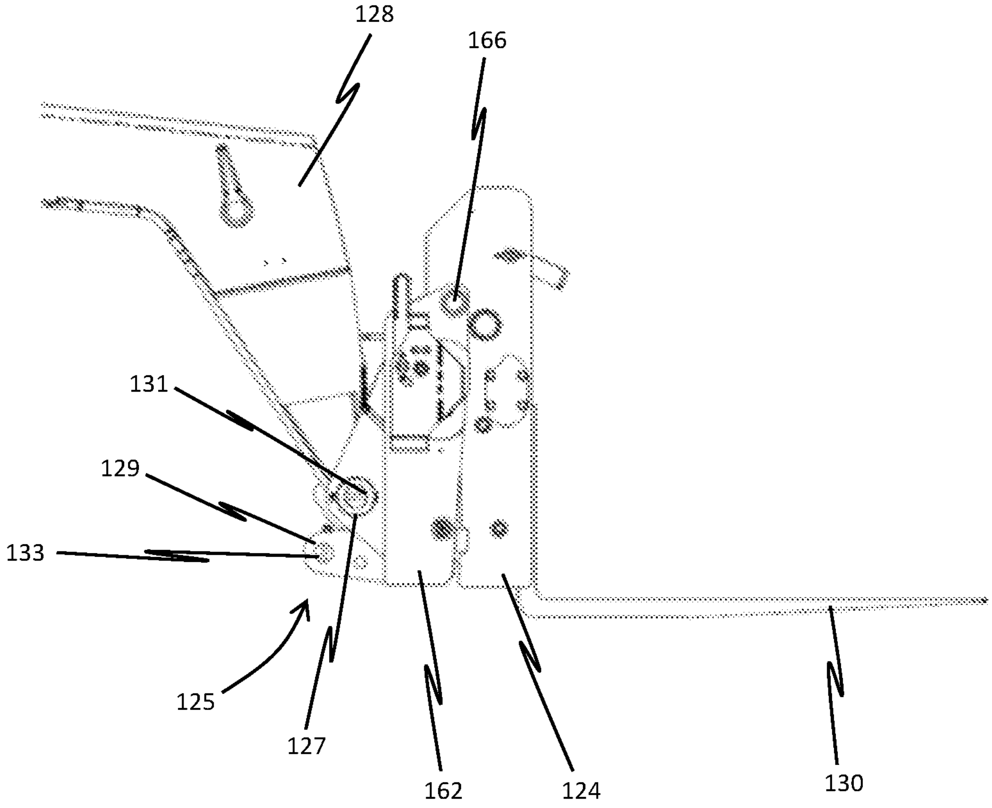
FIG. 15 is a side view of a carriage assembly, including the carriage of FIG. 13, mounted to the end of a working arm of a working machine.
Figure 16:
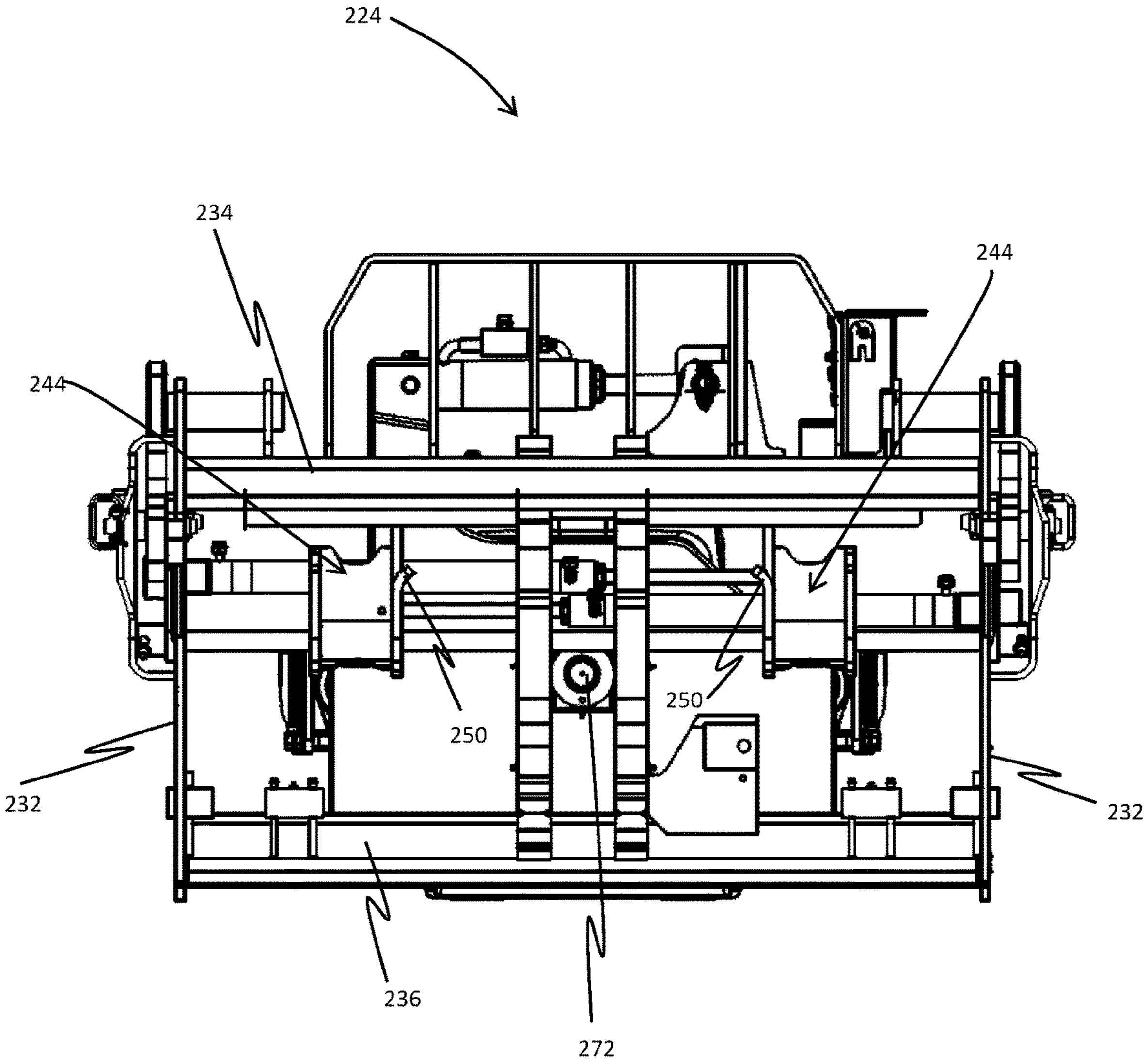
FIG. 16 is a front view of a carriage according to an embodiment.
Figure 17:
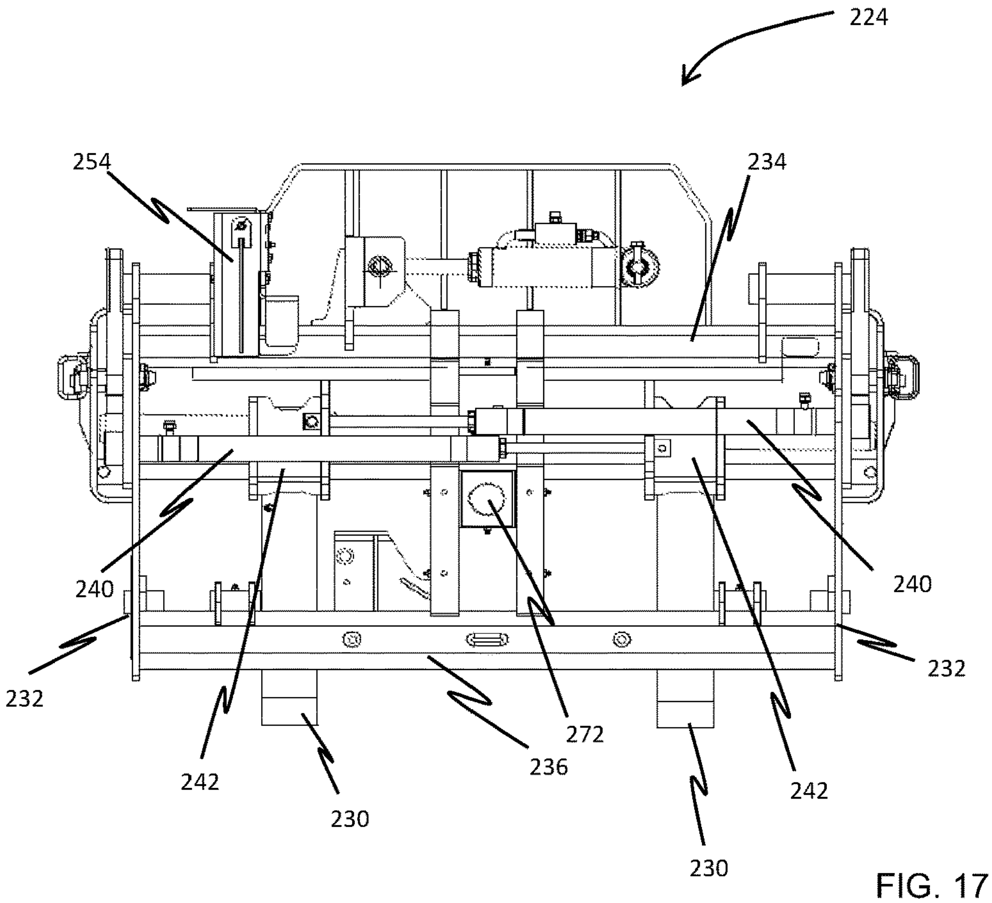
FIG. 17 is a rear view of the carriage of FIG. 16.

Referring now to FIGS. 13 to 15, a carriage 124 is illustrated. Only the differences between the carriage 24 of FIGS. 17 to 20 will be described here, and similar reference features include a prefix '1' in place of the prefix '9'.

The carriage 124 forms part of a carriage assembly 160. The carriage assembly 160 is mounted to the working machine 910 described with reference to FIG. 9. The carriage assembly 160 includes an intermediate carriage 162. The intermediate carriage 162 is mounted to the second, or distal, end 921 of the working arm 920. Put another way, the carriage 124 is mounted to the distal end of the working arm 920 via the intermediate carriage 162. The intermediate carriage 162 may be considered to be a tool mounting carriage, configured to mount different working implements to the working arm 920.

The carriage 124 is provided with a mounting arrangement 164 for mounting the carriage 124 to the working arm 920. In this arrangement, the mounting arrangement 164 is configured to mount the carriage 124 to the intermediate carriage 162. The mounting arrangement is provided in the form of a pair of hooks 164. The mounting arrangement 164 is configured to receive a carriage mounting shaft 166 therein to mount the carriage 124 to the intermediate carriage 162. The intermediate carriage 162 includes the mounting arrangement 125 for mounting the intermediate carriage 162 to the working arm 920. The mounting arrangement is substantially the same as the mounting arrangement 925 described with reference to FIGS. 18 to 20.

Referring now to FIGS. 16 to 20, a carriage 224 is illustrated. Only the differences between the carriage 924 of FIGS. 9 to 12 will be described here, and similar reference features include a prefix '2' in place of the prefix '9'.

The carriage 224 forms part of a carriage assembly 260. The carriage assembly 260 is mounted to the working machine 910 described with reference to FIG. 9. The carriage assembly 260 may be configured to enable a working implement 230 mounted to the carriage 224 to be maneuvered/rotated about three planes (i.e. about first, second and third axes), The carriage assembly 260 includes a first coupling body 268 and a second coupling body 270. The first coupling body 268 is mounted to the second, or distal, end 921 of the working arm 920. The second coupling body 270 is mounted to the first coupling body 268. The carriage 224 is mounted to the second coupling body 270. Put another way, the carriage 224 is mounted to the distal end of the working arm 920 via the first and second coupling bodies 268, 270.

The first coupling body 268 is integrally formed, e.g. integrally cast, as a unitary component. The first coupling body 268 includes a mounting arrangement 225 for pivotally mounting the first coupling body 262 to the working arm 920. The mounting arrangement 225 is provided in the form of first and second pairs of opposing tilt pin holes 227, 229 configured to receive first and second tilt pins 231, 233 therethrough for mounting the first coupling body 268 to the working arm 20. The first coupling body 268 is pivotable relative to the working arm 920 about a first axis. The first axis is a lateral axis or horizontal axis. Put another way, the first axis is a substantially transverse axis of the machine 910. The first axis is substantially parallel to the rotational axis between the working arm 920 and the body 912. The first coupling body 268 includes a tilt actuator mount for mounting a tilt actuator (not shown) that is connected to the working arm 920. The tilt actuator is configured to tilt the first coupling body 268 relative to the working arm 920 about the first axis.

The second coupling body 270 is integrally formed, e.g. integrally cast, as a unitary component. The second coupling body 270 is pivotally mounted to the first coupling body 268. The carriage assembly 260 includes an actuator (not shown) to pivot the second coupling body 270 relative to the first coupling body 268. The second coupling body 270 is pivotable relative to first coupling body 268 about a second axis that is substantially perpendicular to the first axis. The second axis is a substantially upright axis. Put another way, the second axis is a vertical axis. The second coupling body 270 includes a swivel mounting arrangement in the form of opposing first and second swivel pin holes. The first and second swivel pin holes are configured to receive a swivel pin therethrough for pivotally mounting the second coupling body 270 to the first coupling body 268. The swivel pin extends along the second axis. The second axis extends in a direction between the first and second swivel pin holes. Put another way, the second axis is defined by an axis extending between the first and second swivel pin holes.

The carriage assembly 260 includes the carriage 224. The fork mounting shaft 238 is arranged so as to be substantially parallel with the first axis. The carriage 224 is pivotally mounted to the second coupling body 270. The carriage 224 is pivotable relative to the second coupling body 64 about a third axis. The carriage assembly 260 includes an actuator (not shown) to pivot the carriage 224 relative to the second coupling body 270. The third axis is substantially perpendicular to the first axis and the second axis. The third axis is a substantially fore-aft axis. The third axis is substantially parallel to the direction of projection of the forks 230 from the carriage assembly 260. The carriage 224 is pivotally mounted to the second coupling body 270 via a pivot pin 272.

Each adjuster body 242 has a first recess 244 configured to receive at least a part of one of the forks 230 therein. The first recess 244 defines a width which tapers in a direction towards a base (not shown) of the first recess 244. A distal, i.e. upper, region 250 of the first recess 244 may be curved in some arrangements. It will be appreciated that one or both of the side walls of the first recess may be curved.

The carriage 224 includes a hydraulic block 254 mounted thereto. The hydraulic block 254 is connectable to a first auxiliary hydraulic connector (not shown) of the working machine 910. It will be appreciated that the first auxiliary hydraulic connector configured for supplying hydraulic fluid to the actuator may be provided on the working arm 920 of the working machine 910.

The one or more embodiments are described above by way of example only and variations are possible without departing from the scope of protection afforded by the appended claims.

Clauses

Clause 1. A side-shift fork carriage for a material handling machine comprising: a frame comprising a coupling portion for attaching the sliding fork carrier to the material handling machine; a first shuttle comprising a first fork attachment member for receiving a first fork;

a first fork actuator operable to side-shift the first shuttle relative to the frame; a second shuttle comprising a second fork attachment member for receiving a second fork; and, a second fork actuator operable to side-shift the second shuttle relative to the frame; wherein the first and second fork actuators are operable to side-shift the first and second shuttles to alter the distance therebetween; and, wherein the first and second actuators are located above the first and second fork attachment members.

Clause 2. The carriage of Clause 1 wherein the first and second fork actuators are operable in a first mode in which the position of the first and second shuttles are side-shifted to alter the lateral distance therebetween, and a second mode in which the first and second shuttles are shifted in a common direction at a common speed such that the lateral distance therebetween remains constant.

Clause 3. The carriage of Clauses 1 or 2, wherein, in the first mode, the first and second fork actuators are operable to simultaneously move the first and second shuttles in opposing directions.

Clause 4. The carriage of any preceding Clause, wherein the first and second fork actuators are located behind a protective panel above the first and second fork attachment members.

Clause 5. The carriage of any preceding Clause, wherein in the first and second fork attachment members are provided by a common elongate attachment member.

Clause 6. The carriage of any preceding Clause, further comprising a guide member along which the first and second shuttles laterally shift.

Clause 7. The carriage of Clause 6 when dependent on Clause 4, wherein the guide member is located behind the protective panel, optionally above the first and second fork actuators.

Clause 8. The carriage of Clauses 6 or 7, wherein the guide member is a first guide member and the carriage further comprises a second guide member located towards a lowermost portion of the first and second shuttles.

Clause 9. The carriage of Clause 8, wherein the second guide member is located at to the rear of a contacting surface of the first and second shuttles so as to restrict rearward movement of the first and second shuttles about the respective attachment members when loaded.

Clause 10. The carriage of Clause 9, wherein the second guide member comprises a running surface against which the first and second shuttles are urged under load and against which the first and second shuttles contact whilst shifting.

Clause 11. The carriage of Clause 10, wherein the first and second shuttles comprise bearings configured to run on the running surface, wherein, optionally, the bearings are roller bearings having a vertical axis of rotation.

Clause 12. The carriage of Clause 11, wherein each of the first and second shuttles comprise first and second bearings located on either side of a fork when attached to the respective shuttle.

Clause 13. The carriage of any of Clauses 11 or 12, wherein the bearings are provided at the lowermost terminal end of the first and second shuttles.

Clause 14. The carriage of any of Clauses 11 to 13, wherein the bearings are located within a bearing enclosure.

Clause 15. The carriage of any of Clauses 6 to 14 further comprising an intermediate guide member located at a mid-portion of the first and second shuttle.

Clause 16. The carriage of Clause 15, wherein the intermediate guide member is positioned proximate to the attachment member.

Clause 17. The carriage of Clauses 15 or 16, wherein the intermediate guide member is positioned aft of the first and second fork attachment member(s) and, optionally, below the first and second fork attachment members so as to be partly shielded by the attachment member(s).

Clause 18. The carriage of any of Clauses 6 to 17 wherein first and second shuttles comprise one or more bushes which slidably engage with the first or intermediate guide member.

Clause 19. The carriage of any preceding Clause, wherein the frame comprises a first side member and a second side member between which the first shuttle and second shuttle are vertically disposed, the frame further comprising a lower cross-member located beneath the fork attachment bar.

Clause 20. The carriage of Clause 19, wherein the lower cross-member and common fork attachment members define a window therebetween, the window comprising the first and second shuttle members only or, optionally, the first and second shuttle members and a shuttle guide member only.

Clause 21. The carriage of either of Clauses 19 or 20, wherein the frame comprises a vertical central member extending between the lower cross-member and the fork attachment member.

Clause 22. The carriage of any of Clauses 19 to 21, wherein the lower member comprises a the second guide member, wherein, optionally, the lower cross-member comprises an elongate box section member with the running surface provided on the front facing surface thereof.

Clause 23. The carriage of any preceding Clause, wherein the first and second shuttles comprise first and second parallel sidewalls separated by a gap to define a pocket in which the respective fork is received.

Clause 24. The carriage of any of Clauses 6 to 23, wherein each of the fork attachment members and guide member extend between the first and second side members.

Clause 25. The carriage of Clause 24 when dependent on Clause 21, wherein the fork attachment member and guide member extend through the central member.

Clause 26. The carriage of any preceding Clause, wherein the coupling portion comprises first and second side attachments arranged towards the first and second sides of the frame, the first and second side attachments configured to receive corresponding attachments on a material handling machine.

Clause 27. A material handling machine comprising the carriage of any preceding Clause.

Clause 28. A carriage for mounting to a working arm of a working machine, the carriage comprising: two side members, and upper and lower cross members extending between the two side members; an implement mount comprising a fork mounting shaft extending between the two side members and configured for mounting first and second forks thereon to mount said forks to the carriage; and an adjuster assembly comprising an actuator mounted on the carriage, the actuator connected to a hydraulic flow path for delivering hydraulic pressure to the actuator, wherein the actuator is configured to move the forks on the fork mounting shaft.

Clause 29. The carriage according to Clause 28, wherein the adjuster assembly comprises first and second adjuster bodies each comprising a first recess configured to receive at least a part of one of the forks therein, and wherein the actuator is configured to move the adjuster bodies in order to move the forks.

Clause 30. The carriage according to Clause 29, wherein the recess tapers in a direction towards a base of the recess.

Clause 31. The carriage according to Clause 29 or Clause 30, wherein a distal region of each recess is curved.

Clause 32. The carriage according to any one of Clauses 29 to 31, wherein the first and second adjuster bodies are mounted on an adjuster cross member mounted between the side members.

Clause 33. The carriage according to any one of Clauses 29 to 32, wherein each adjuster body comprises a second recess configured to receive the fork mounting shaft therein.

Clause 34. The carriage according to any one of Clauses 29 to 33, wherein the adjuster assembly comprises first and second actuators configured to move first and second adjuster bodies, respectively.

Clause 35. The carriage according to Clause 34, comprising a valve along the hydraulic flow path to equally distribute hydraulic flow between the first and second actuators.

Clause 36. The carriage according to any preceding Clause, wherein the adjuster assembly is configured such that, in a first mode, the first and second forks are fixed relative to each when they are moved along the fork mounting shaft, and, in a second mode, the first and second forks are moveable relative to each other about a fixed centre point.

Clause 37. The carriage according to any preceding Clause, comprising a hydraulic block mounted to the carriage and connected upstream of the hydraulic flow path.

Clause 38. The carriage according to any preceding Clause, wherein the upper cross member defines a recess of channel, and wherein the actuator is positioned within the channel.

Clause 39. The carriage according to any preceding Clause, wherein the fork mounting shaft is releasably mounted to the side members.

Clause 40. The carriage according to any preceding Clause, comprising a mounting arrangement for pivotally mounting the carriage to an arm of a working machine.

Clause 41. The carriage according to any preceding Clause, wherein the adjuster assembly is configured such that, in a first mode, the first and second forks are fixed relative to each when they are moved along the fork mounting shaft, and, in a second mode, the first and second forks are moveable relative to each other about a fixed centre point.

Clause 42. A carriage assembly comprising: a tool mounting carriage comprising a mounting arrangement for pivotally mounting the tool mounting carriage to an arm of a working machine; and a carriage according to any preceding Clause mounted to the tool mounting carriage.

Clause 43. A carriage assembly comprising: a first coupling body comprising an arm mounting arrangement for pivotally mounting the first coupling body to an arm of a working machine so as to be pivotable relative to the arm about a first axis; a second coupling body pivotally mounted to the first coupling body so as to be pivotable relative to first coupling body about a second axis that is substantially perpendicular to the first axis, a carriage according to any one of Clauses 28 to 41 pivotally mounted to the second coupling body so as to be pivotable relative to the second coupling body about a third axis that is substantially perpendicular to the first axis and the second axis.

Clause 44. The carriage assembly according to Clause 43, wherein the first coupling body is integrally formed, e.g. integrally cast, as a unitary component and/or wherein the second coupling body is integrally formed, e.g. integrally cast, as a unitary component.

Clause 45. A working machine comprising: a body; a ground engaging propulsion arrangement supporting the body; a working arm pivotally connected to the body; and a carriage assembly according to any one of Clauses 28 to 41 or a carriage assembly according to Clause 42 or Clause 43 mounted to a distal end of the working arm.

Clause 46. A working machine according to Clause 45, comprising a first auxiliary hydraulic connector configured for supplying hydraulic fluid to the actuator.

Clause 47. A working machine according to Clause 42 or Clause 43, wherein the first auxiliary connector is provided on the working arm.

Clause 48. A working machine according to any one of Clauses 18 to 20, wherein the adjuster assembly is configured such that, in a first mode, the first and second forks are fixed relative to each when they are moved along the fork mounting shaft, and, in a second mode, the first and second forks are moveable relative to each other about a fixed centre point.

Clause 49. A working machine according to Clause 48, comprising an operator input and a control system configured to select the first mode or the second mode based on an input to the operator input.

Clause 50. A working machine according to any one of Clauses 45 to 49, wherein the working machine is a telescopic handler, a rotating telescopic handler, a forklift, a skid-steer loader, a compact track loader, a wheel loader, or a telescopic wheel loader.

The invention claimed is:

1. A side-shift fork carriage for a material handling machine comprising:

a frame;

a first shuttle comprising a first fork attachment member for receiving a first fork;

a first fork actuator operable to side-shift the first shuttle relative to the frame;

a second shuttle comprising a second fork attachment member for receiving a second fork;

a second fork actuator operable to side-shift the second shuttle relative to the frame, wherein the first and second fork actuators are operable in a first mode in which the position of the first and second shuttles are side-shifted to alter the lateral distance therebetween, and a second mode in which the first and second shuttles are shifted unidirectionally with the lateral distance therebetween remaining constant; and a valve block configured to selectively provide an actuating hydraulic flow to the first and second fork actuators to provide the first mode and the second mode, wherein the valve block comprises a changeover valve to switch between the first mode and the second mode, wherein the valve block comprises first input ports and second input ports, each of the first and second input ports configured to receive, respectively, a first actuating hydraulic feed and a second actuating hydraulic feed, and wherein, when connected to the first and second actuating hydraulic feeds, the valve block is configured to provide the first mode and the second mode using the first actuating hydraulic feed and the second actuating hydraulic feed without switching the changeover valve.

2. The carriage of claim 1, wherein the first and second actuators are hydraulic cylinders comprising a rod end port and a cap end port, wherein either the rod end ports of the first and second actuators or the cap end ports of the first and second actuators are connected in hydraulic flow series in the second mode.

3. The carriage of claim 2, wherein the rod end ports are connected in hydraulic flow series such that an actuating hydraulic feed provided to the cap end port of one of the first or second fork actuators results in a return flow from the cap end port of the other first or second fork actuators in the second mode.

4. The carriage of claim 1, wherein, when in the first mode, either both the rod end ports or both the cap end ports are configured to receive a matching actuating hydraulic flow to result in simultaneous corresponding extension or retraction of both first and second fork actuators.

5. The carriage of claim 4, further comprising a flow divider, wherein the actuating hydraulic flow is provided to the rod end ports or cap end ports via the flow divider.

6. The carriage of claim 1, wherein the changeover valve is manually operated.

7. The carriage of claim 1, wherein the valve block is configured to be operable in the first mode and second mode when connected to a first actuating hydraulic feed only, wherein the first mode and second mode are provided by switching the changeover valve between a first position which corresponds to the first mode and a second position which corresponds to the second mode.

8. The carriage of claim 1, wherein the valve block comprises first mode first and second hydraulic lines, wherein each of the first and second hydraulic lines comprise pilot operated check valves, wherein an actuating flow in either of the first mode first or second hydraulic lines is configured to provide pilot pressure in the other of the first and second hydraulic line pilot operated check valves, thereby providing a return flow path.

9. The carriage of claim 8, wherein, when in the first mode, either both the rod end ports or both the cap end ports are configured to receive a matching actuating hydraulic flow to result in simultaneous corresponding extension or retraction of both first and second fork actuators, further comprising a flow divider, wherein the actuating hydraulic flow is provided to the rod end ports or cap end ports via the flow divider, wherein either of the first mode first or second hydraulic lines comprises the flow divider.

10. The carriage of claim 1, wherein the valve block comprises second mode first and second hydraulic lines in hydraulic flow communication with the cap end ports of the first and second fork actuators respectively.

11. The carriage of claim 10, further comprising a pair of pressure relief valves connected in anti-parallel between the second mode first and second hydraulic lines and/or flow restrictors in the second mode first and second hydraulic lines to restrict the flow rate in the second mode relative to the first mode.

12. The carriage of claim 1, wherein the first and second fork actuators are arranged horizontally and in an anti-parallel orientation.

13. The carriage of claim 12, wherein when the first and second fork actuators are hydraulic cylinders, the cap end of each cylinder is attached to an outboard side of the frame.

* * * * *